(12) United States Patent
Yasuda et al.

(10) Patent No.: US 11,094,931 B2
(45) Date of Patent: Aug. 17, 2021

(54) NEGATIVE ELECTRODE ACTIVE MATERIAL FOR LITHIUM ION SECONDARY BATTERY, NEGATIVE ELECTRODE FOR LITHIUM ION SECONDARY BATTERY, AND LITHIUM ION SECONDARY BATTERY

(71) Applicant: Hitachi Chemical Company, Ltd., Tokyo (JP)

(72) Inventors: Akira Yasuda, Tokyo (JP); Yoshie Ohsaki, Tokyo (JP); Tatsuya Nishida, Tokyo (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 0 days.

(21) Appl. No.: 16/966,347

(22) PCT Filed: Jan. 31, 2018

(86) PCT No.: PCT/JP2018/003285
§ 371 (c)(1),
(2) Date: Jul. 30, 2020

(87) PCT Pub. No.: WO2019/150513
PCT Pub. Date: Aug. 8, 2019

(65) Prior Publication Data
US 2020/0373563 A1 Nov. 26, 2020

(51) Int. Cl.
*H01M 4/36* (2006.01)
*H01M 4/48* (2010.01)
(Continued)

(52) U.S. Cl.
CPC ........... *H01M 4/366* (2013.01); *H01M 4/483* (2013.01); *H01M 4/625* (2013.01);
(Continued)

(58) Field of Classification Search
CPC ............ H01M 4/36; H01M 4/13; H01M 4/48; H01M 4/62; H01M 10/0525
See application file for complete search history.

(56) References Cited

U.S. PATENT DOCUMENTS

| | | | |
|---|---|---|---|
| 2010/0086848 A1 | 4/2010 | Takeuchi et al. | |
| 2016/0079591 A1* | 3/2016 | Yang | C04B 35/62884 |
| | | | 429/231.8 |
| 2016/0276668 A1 | 9/2016 | Nagayama et al. | |

FOREIGN PATENT DOCUMENTS

| | | |
|---|---|---|
| CN | 107026259 A | 8/2017 |
| JP | 2002-255530 A | 9/2002 |

(Continued)

OTHER PUBLICATIONS

Machine Translation of JP 2015/210959, Kanto et al., Nov. 24, 2015.*

(Continued)

*Primary Examiner* — Kenneth J Douyette
(74) *Attorney, Agent, or Firm* — Fitch, Even, Tabin & Flannery, LLP

(57) ABSTRACT

A negative electrode active material for a lithium ion secondary battery includes silicon oxide particles, each of which has carbon on at least a portion of its surface, in which: a ratio ($P_{Si}/P_{SiO2}$) of an intensity of an X-ray diffraction peak at 2θ of from 27° to 29°, which is derived from Si, to an intensity of an X-ray diffraction peak at 2θ of from 20° to 25°, which is derived from $SiO_2$, is within a range of from 1.0 to 2.6, when CuKα radiation having a wavelength of 0.15406 nm is used as a radiation source; and a ratio ($S_{H2O}/S_{N2}$) of a specific surface area calculated from moisture adsorption at 298 K to a specific surface area calculated from nitrogen adsorption at 77 K is 0.60 or less.

12 Claims, 6 Drawing Sheets

(51) Int. Cl.
*H01M 4/62* (2006.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/027* (2013.01)

(56) References Cited

FOREIGN PATENT DOCUMENTS

| | | |
|---|---|---|
| JP | 3952180 B | 8/2007 |
| JP | 4171897 B | 10/2008 |
| JP | 2010-055775 A | 3/2010 |
| JP | 2010-086896 A | 4/2010 |
| JP | 2011-090869 A | 5/2011 |
| JP | 2015-028855 A | 2/2015 |
| JP | 2015-167145 A | 9/2015 |
| JP | 2015-210959 A | 11/2015 |
| JP | 2015-210960 A | 11/2015 |
| JP | 2015-210962 A | 11/2015 |
| JP | 2016-506029 A | 2/2016 |
| JP | 2016-522139 A | 7/2016 |
| JP | 2016-164884 A | 9/2016 |
| JP | 2016-219410 A | 12/2016 |
| WO | 2015/080203 A1 | 6/2015 |
| WO | 2015/159935 A1 | 10/2015 |
| WO | 2016/147976 A1 | 9/2016 |

OTHER PUBLICATIONS

"A Basic Guide to Particle Characterization", Malvern Instruments Worldwide—White Paper, May 2, 2012, pp. 1-26, XP055089322 (cited in European Search Report (ESR) and an Office action in counterpart EP Appln. dated Dec. 16, 2020).

\* cited by examiner

NEGATIVE ELECTRODE ACTIVE MATERIAL FOR LITHIUM ION SECONDARY BATTERY, NEGATIVE ELECTRODE FOR LITHIUM ION SECONDARY BATTERY, AND LITHIUM ION SECONDARY BATTERY

CROSS-REFERENCE TO RELATED APPLICATIONS

This application is a U.S. national phase application filed under 35 U.S.C. § 371 of International Application No. PCT/JP2018/003285, filed Jan. 31, 2018, designating the United States, the entire contents of which are hereby incorporated herein by reference.

TECHNICAL FIELD

The present invention relates to a negative electrode active material for a lithium ion secondary battery, a negative electrode for a lithium ion secondary battery, and a lithium ion secondary battery.

BACKGROUND ART

Graphite has been mainly used currently as a negative electrode active material for a lithium ion secondary battery. It is known that graphite has a theoretical maximum discharge capacity of 372 mAh/g. In recent years, in association with an increase in the performance of mobile devices, such as cell phones, notebook computers, and tablet-type terminals, demand for development of a negative electrode active material capable of further improving capacity of a lithium ion secondary battery exists.

Having as a background the condition set forth above, it has been studied for using, as a negative electrode active material, materials having higher theoretical capacity than graphite. Among such compounds, silicon oxides, which have a higher capacity, which are inexpensive, and which have excellent processability, are thus particularly intensively researched in terms of applications as negative electrode active materials.

For example, Patent Literature 1 discloses a negative electrode active material, characterized in that a particle having a structure in which microcrystals of silicon are dispersed in a silicon compound is coated on the surface thereof with carbon, in which a diffraction peak derived from Si (111) is observed in x-ray diffractometry, and the silicon crystallite has a size of from 1 nm to 500 nm determined by a Scherrer method based on a half-value width of the diffraction peak.

According to the technique described in Patent Literature 1, it is regarded that, by dispersing microcrystals or microparticles of silicon in an inert robust substance such as, for example, silicon dioxide, and further fusing carbon to at least a part of the surface thereof for imparting conductivity, a structure that not only has stable surface conductivity but is also stable against volume changes of silicon associated with absorption and desorption of lithium can be obtained, as a result of which long-term stability and initial efficiency can be improved.

Patent Literature 2 discloses a negative electrode active material, characterized in that a surface of a silicon oxide particle is coated with a graphite film, in which the amount of graphite coating is from 3% by weight to 40% by weight, a BET specific surface area is from 2 m²/g to 30 m²/g, and the graphite film has a graphite structure-intrinsic spectrum with Raman shifts of near 1330 cm$^{-1}$ and near 1580 cm$^{-1}$ by Raman spectroscopy.

According to the technique described in Patent Literature 2, it is regarded that, by adjusting the physical property of the graphite film for coating the surface of the material capable of absorbing and desorbing a lithium ion to a specific range, a negative electrode for a lithium ion secondary battery that may achieve a property level satisfying demands of the market can be obtained.

Patent Literature 3 discloses a negative electrode active material, in which a surface of a particle of a silicon oxide represented by a formula $SiO_x$ is coated with a carbon film and the carbon film is a thermal plasma treated film.

According to the technique described in Patent Literature 3, it is regarded that a negative electrode active material with which the problems of expansion of the electrode, which is a drawback of a silicon oxide, and expansion of the battery due to gas generation can be solved, and which has excellent cycle characteristics can be obtained.

RELATED ART DOCUMENT

Patent Document

Patent Literature 1: Japanese Patent No. 3952180
Patent Literature 2: Japanese Patent No. 4171897
Patent Literature 3: Japanese Patent Application Laid-Open (JP-A) No. 2011-90869

In future, it will be required that a negative electrode active material to be applied to a lithium ion secondary battery suitable for improving the performance of mobile devices and the like can store a large amount of lithium ions (that is, required to have a higher capacity) as well as to desorb more lithium ions that have been stored therein. Therefore, with regard to a negative electrode active material that contributes to further improvement in the performance of a lithium ion secondary battery, improvements in the initial discharge capacity is important. In addition, with regard to a negative electrode active material that contributes to further improvement in the performance of a lithium ion secondary battery, restriction of expansion of an electrode is also important. Furthermore, high temperature storage characteristics of lithium-ion batteries, using the recovery rate after charging and discharging as an indicator, need to be further improved.

An embodiment of the present invention is made in consideration of the above demands, and an object of the invention is to provide a negative electrode active material for a lithium ion secondary battery which may improve an initial discharge capacity and a storage characteristics at high temperature of a lithium ion secondary battery, and which may restrict an expansion of an electrode, a negative electrode for a lithium ion secondary battery using the same, and a lithium ion secondary battery using the same.

Solution to Problem

The specific means to solve the problems are as follows.
<1> A negative electrode active material for a lithium ion secondary battery, the negative electrode active material including silicon oxide particles, each of which has carbon on at least a portion of its surface, in which:
a ratio ($P_{Si}/P_{SiO2}$) of an intensity of an X-ray diffraction peak at 2θ of from 27° to 29°, which is derived from Si, to an intensity of an X-ray diffraction peak at 2θ of from 20° to 25°, which is derived from $SiO_2$, is within a range of from 1.0 to 2.6, when CuKα radiation having a wavelength of 0.15406 nm is used as a radiation source; and a ratio ($S_{H2O}/S_{N2}$) of a specific surface area calculated from moisture adsorption at 298 K to a specific surface area calculated from nitrogen adsorption at 77 K is 0.60 or less.

<2> The negative electrode active material for a lithium ion secondary battery according to <1>, in which an mean aspect ratio represented by a ratio (S/L) of a minor axis S to a major axis L is within a range of 0.45≤S/L≤1.

<3> The negative electrode active material for a lithium ion secondary battery according to <1> or <2>, in which the negative electrode active material has a ratio (D10%/D90%) of 0.1 or greater, in which D90% is a particle diameter corresponding to 90% cumulative from a smaller particle diameter side in a cumulative volume distribution curve obtained by a laser diffraction/scattering method, and D10% is a particle diameter corresponding to 10% cumulative from the smaller particle diameter side in the cumulative volume distribution curve.

<4> The negative electrode active material for a lithium ion secondary battery according to any one of <1> to <3>, in which a content of the carbon is within a range from 0.1% by mass to 10.0% by mass of a total of the silicon oxide particles and the carbon.

<5> The negative electrode active material for a lithium ion secondary battery according to any one of <1> to <4>, the negative electrode active material having a diffraction peak that is attributed to Si (111) in X-ray diffraction spectra, in which a size of silicon crystallites calculated from the diffraction peak is from 1.0 nm to 15.0 nm.

<6> The negative electrode active material for a lithium ion secondary battery according to any one of <1> to <5>, in which a volume mean particle diameter is from 0.1 μm to 20 μm.

<7> The negative electrode active material for a lithium ion secondary battery according to any one of <1> to <6>, in which a specific surface area calculated from nitrogen adsorption at 77 K is from 0.1 m$^2$/g to 10 m$^2$/g.

<8> The negative electrode active material for a lithium ion secondary battery according to any one of <1> to <7>, further including a carbon-based negative electrode active material.

<9> A negative electrode for a lithium ion secondary battery, the negative electrode including:

a current collector; and a negative electrode material layer that is provided on or above the current collector and that includes the negative electrode active material for a lithium ion secondary battery according to any one of <1> to <8>.

<10> A lithium ion secondary battery, including:

a positive electrode;

the negative electrode for a lithium ion secondary battery according to <9>; and an electrolyte.

Effects of Invention

According to an embodiment in the invention, there can be provided a negative electrode active material for a lithium ion secondary battery which may improve an initial discharge capacity and a storage characteristics at high temperature of a lithium ion secondary battery, and which may restrict an expansion of an electrode, a negative electrode for a lithium ion secondary battery using the same, and a lithium ion secondary battery using the same.

DESCRIPTION OF EMBODIMENTS

Figure 1:
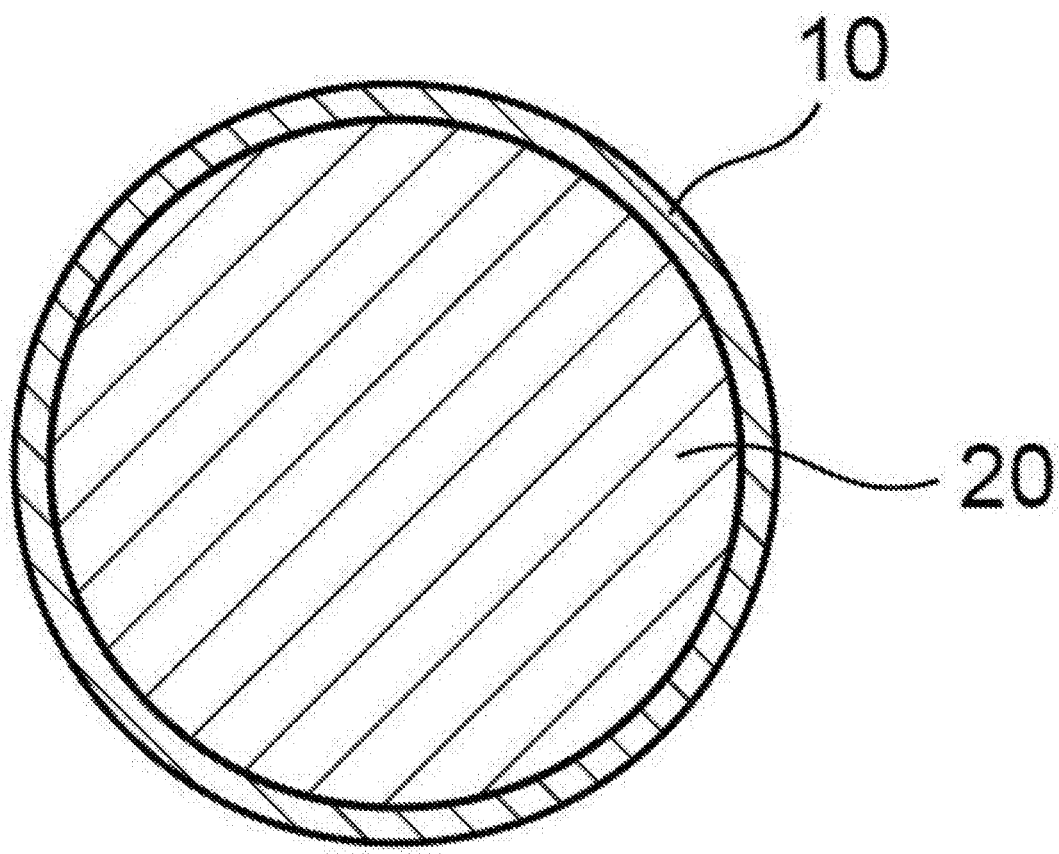
FIG. 1 is a schematic sectional view illustrating an example of a structure of a negative electrode active material.

Embodiments of the invention are described below in detail. It is noted here, however, that the invention is not restricted to the embodiments described below. In the below-described embodiments, the constituents thereof (including element steps and the like) are not indispensable unless otherwise specified. The same applies to the numerical values and ranges thereof, without restricting the invention.

In the present disclosure, the term "process" encompasses not only processes discrete from other processes but also steps which cannot be clearly distinguished from other processes, as long as the intended purpose of the process is achieved.

In the present disclosure, each numerical range specified using "(from) . . . to . . . " represents a range including the numerical values noted before and after "to" as the minimum value and the maximum value, respectively.

In a set of numerical ranges that are stated stepwise in the present specification, the upper limit value or the lower limit value of a numerical range may be replaced with the upper limit value or the lower limit value of other numerical range. Further, in a numerical range stated in the present specification, the upper limit value or the lower limit value of the numerical range may be replaced with a relevant value indicated in any of Examples.

In the present disclosure, each component may include plural kinds of substances corresponding to the component. In a case in which there are plural kinds of substances that correspond to a component of a composition, the indicated content ratio or amount of the component in the composition means, unless otherwise specified, a total content ratio or amount of the plural kinds of substances existing in the composition.

In the present disclosure, each component may include plural kinds of particles corresponding to the component. In a case in which there are plural kinds of particles that correspond to a component of a composition, the indicated particle diameter of the component in the composition means, unless otherwise specified, a value determined for a mixture of the plural kinds of particles existing in the composition.

In the present disclosure, the term "layer" or "film" includes, when observing a region where the layer or the film is present, a case in which the layer or the film is formed only on a part of the region in addition to a case in which the layer or the film is formed on the entirety of the region.

In the present disclosure, the term "layered" as used herein indicates that plural layers are piled up, in which two or more layers may be bonded to each other or may be detachable from each other.

In the present disclosure, when embodiments are explained with referring to any Figure, the embodiments are not restricted to the configuration shown in the Figure. Sizes of members shown in each of the Figures are conceptual, and relative relationship in size of the members is not restricted to that shown therein.

<Negative Electrode Active Material for Lithium Ion Secondary Battery>

The negative electrode active material for a lithium ion secondary battery in the present disclosure (hereinafter, also abbreviated simply to "negative electrode active material") includes silicon oxide particles, each of which has carbon on at least a portion of its surface, wherein: a ratio ($P_{Si}/P_{SiO2}$) of an intensity of an X-ray diffraction peak at 2θ of from 27° to 29°, which is derived from Si, to an intensity of an X-ray diffraction peak at 2θ of from 20° to 25°, which is derived from $SiO_2$, is within a range of from 1.0 to 2.6, when CuKα radiation having a wavelength of 0.15406 nm is used as a radiation source; and a ratio ($S_{H2O}/S_{N2}$) of a specific surface area calculated from moisture adsorption at 298 K to a specific surface area calculated from nitrogen adsorption at 77 K is 0.60 or less.

(Silicon Oxide Particle)

The silicon oxide which forms the silicon oxide particles included in the negative electrode active material may be any one as long as it is an oxide containing a silicon element, and examples thereof include oxidized silicon, silicon dioxide, and silicon suboxide. The silicon oxide included in the silicon oxide particles may be only one kind or a combination of two or more kinds thereof.

Among the silicon oxides, oxidized silicon and silicon dioxide are generally represented by silicon monoxide (SiO) and silicon dioxide ($SiO_2$), respectively. However, depending on the surface state (for example, presence of an oxide film) or the condition of composition generation, the silicon oxide is sometimes represented by the composition formula SiO (x represents 0<x≤2) as an actual measured value (or a corresponding value) of an element contained, and this case is also included in the silicon oxide according to the present disclosure. Here, the value of x in the composition formula can be calculated by measuring oxygen contained in the silicon oxide by an inert gas fusion-nondispersive infrared absorption method. In a case in which a disproportionation reaction (2SiO→Si+$SiO_2$) of the silicon oxide is associated with the manufacturing process of the negative electrode active material, the silicon oxide is sometimes represented by the state including silicon and silicon dioxide (or in some cases, oxidized silicon) in the chemical reaction, and this case is also included in the silicon oxide according to the present disclosure.

A mean particle diameter of the silicon oxide particles is not particularly limited. For example, a volume mean particle diameter thereof is preferably from 0.1 μm to 20 μm, and more preferably from 0.5 μm to 10 μm, according to a desired final size of the negative electrode material. The volume mean particle diameter of the silicon oxide particles is D50% which is a particle diameter corresponding to 50% cumulative from the smaller particle diameter side in a volume-based particle size distribution curve. The same applies to an expression of a mean particle diameter described below. The volume mean particle diameter is measured by a laser diffraction/scattering method by the method described in Examples below.

(Carbon)

Carbon is present on a part or an entire of the surface of each of the silicon oxide particles. The presence of carbon on a part or an entire of the surface of each of the silicon oxide particle imparts conductivity to the silicon oxide particle, which is an insulator, and improves the efficiency of the charge-discharge reaction. It is considered that the initial discharge capacity and the initial charge/discharge efficiency are thus improved. Hereinafter, the silicon oxide particle in which carbon is present on a part or an entire of the surface is sometimes referred to as a "SiO—C particle".

In the present disclosure, examples of the carbon present on a part or an entire of the surface of the silicon oxide particle include graphite, amorphous carbon, and the like. It is noted that an organic substance described below does not fall under the "carbon" in the present disclosure.

The manner in which the carbon is present on a part or an entire of the surface of the silicon oxide particle is not particularly limited. For example, continuous or discontinuous coating and the like can be mentioned.

The presence or absence of carbon in the negative electrode active material for a lithium ion secondary battery can be observed by, for example, laser Raman spectroscopy at an excitation wavelength of 532 nm or the like.

A content of the carbon is preferably from 0.1% by mass to 10.0% by mass in a total content of a mass of the silicon oxide particles and a mass of the carbon. With such a configuration, the initial discharge capacity and the initial charge/discharge efficiency tend to be further improved. The content of the carbon is more preferably from 1.0% by mass to 9.0% by mass, more preferably from 2.0% by mass to 8.0% by mass, and particularly preferably from 3.0% by mass to 7.0% by mass.

A content (in terms of mass) of the carbon can be determined by, for example, a high-frequency furnace combustion-infrared absorption spectrometry. For example, in the high-frequency furnace combustion-infrared absorption spectrometry, a sulfur/carbon simultaneous analyzer (CSLS600, manufactured by LECO Japan Corporation) may be used. In a case in which the negative electrode active material contains the organic substance described below, the content ratio of the carbon can be measured by removing from the negative electrode active material, in advance, a to-be-decreased mass derived from the organic substance by heating the negative electrode active material to a temperature which is higher than a temperature at which the organic substance degrades (for example, at 300° C.).

The carbon is preferably a carbon with low crystallinity. In the present disclosure, the expression that the carbon is with "low crystallinity" means that an R value of a negative electrode active material obtained by the following method is 0.5 or more.

The R value of a negative electrode active material means a peak intensity ratio Id/Ig (also referred to as D/G), in which Id is a peak intensity at around 1360 $cm^{-1}$ and Ig is a peak intensity at around 1580 $cm^{-1}$, in a profile of a laser Raman spectrum measurement with a wavelength of 532 nm.

Here, the peak at around 1360 $cm^{-1}$ is a peak that is generally identified as corresponding to an amorphous structure, and for example it is a peak observed at from 1300 $cm^{-1}$ to 1400 $cm^{-1}$. The peak at around 1580 $cm^{-1}$ is a peak that generally identified as corresponding to the graphite crystal structure, and for example it is a peak observed at from 1530 $cm^{-1}$ to 1630 $cm^{-1}$.

The R value can be determined using a Raman spectrum measuring apparatus (for example, NSR 1000 manufactured by JASCO Corporation) with setting a baseline to 1050 cm$^{-1}$ to 1750 cm$^{-1}$ with respect to a measurement range (from 830 cm$^{-1}$ to 1940 cm$^{-1}$).

The R value of the negative electrode active material is preferably from 0.5 to 1.5, more preferably from 0.7 to 1.3, and still more preferably from 0.8 to 1.2. In a case in which the R value is from 0.5 to 1.5, a surface of the silicon oxide particle is sufficiently covered with low-crystallinity carbon in which carbon crystallites are randomly oriented, so that a reactivity with an electrolyte solution can be reduced and the cycle characteristics tend to be improved.

A method of applying carbon to a surface of the silicon oxide particle is not particularly limited. Specific examples thereof include a wet mixing method, a dry mixing method, a chemical vapor deposition method and the like.

In a case in which the application of carbon is performed by way of the wet mixing method, examples thereof include a method which includes mixing the silicon oxide particles with a substance in which a raw material of carbon (a carbon source) is dissolved or dispersed in a solvent, attaching the carbon source to the surfaces of the silicon oxide particles, removing the solvent if needed, and then subjecting the resultant to a heat treatment in an inert atmosphere to carbonize the carbon source.

In a case in which the application of carbon is performed by way of the dry mixing method, examples thereof include a method in which a mixture is prepared by mixing the silicon oxide particles in a solid state and the carbon source in a solid state, and the mixture is subjected to a heat treatment in an inert atmosphere to carbonize the carbon source. A treatment for imparting mechanical energy (such as a mechanochemical treatment) may be performed when mixing the silicon oxide particles with the carbon source.

In a case in which the application of carbon is performed by way of the chemical vapor deposition method, a known method may be used. For example, the silicon oxide particles are subjected to a heat treatment in an atmosphere containing vaporized gas of the carbon source to carbonize the carbon source, thereby applying carbon to the surfaces of the silicon oxide particles.

In a case in which carbon is applied to the surfaces of the silicon oxide particles by the wet mixing method or the dry mixing method, the carbon source to be used is not particularly limited as long as it is a material which can be changed to carbon by the heat treatment. Specific examples thereof include polymer compounds such as a phenol resin, a styrene resin, polyvinyl alcohol, polyvinyl chloride, polyvinyl acetate, or polybutyral; pitch such as ethylene heavy end pitch, coal pitch, petroleum pitch, coal tar pitch, asphalt decomposition pitch, PVC pitch obtained by pyrolyzing polyvinyl chloride or the like, or naphthalene pitch prepared by polymerizing naphthalene or the like under the presence of a super-strong acid; and polysaccharides such as starch or cellulose. The carbon source to be used may be only one kind or a combination of two or more kinds thereof.

In a case in which carbon is applied to the surfaces of the silicon oxide particles by the chemical vapor deposition method, the carbon source to be used may be an aliphatic hydrocarbon, an aromatic hydrocarbon, an alicyclic hydrocarbon or the like, and preferably a compound in the form of a gas or a compound which can be easily made into a gas. Specific examples thereof include methane, ethane, propane, toluene, benzene, xylene, styrene, naphthalene, cresol, anthracene, and derivatives thereof. The carbon source to be used may be a natural gas. The carbon source to be used may be only one kind or a combination of two or more kinds thereof.

The heat treatment temperature for carbonizing the carbon source is not particularly limited as long as carbonization of the carbon source can be achieved at the temperature. The heat treatment temperature is preferably 700° C. or higher, more preferably 800° C. or higher, and still more preferably higher than 900° C. From the viewpoints of obtaining a carbon with low crystallinity and producing the silicon crystallite having a desired size by the disproportionation reaction described below, the heat treatment temperature is preferably 1300° C. or lower, more preferably 1200° C. or lower, and still more preferably 1100° C. or lower.

The duration of the heat treatment for carbonizing the carbon source may be selected according to the kind, amount and the like of the carbon source to be used. For example, the duration of the heat treatment is preferably from 1 hour to 10 hours, and more preferably from 2 hours to 7 hours.

The heat treatment for carbonizing the carbon source is preferably performed in an inert atmosphere such as nitrogen or argon. The heat treatment apparatus is not particularly limited, and examples thereof include a heating apparatus applicable to a continuous or batch treatment. Specifically, it may be selected from a fluidized bed-furnace, a revolving furnace, a vertical moving bed furnace, a tunnel furnace, a batch furnace, a rotary kiln or the like.

In a case in which carbon is imparted to the surface of the silicon oxide particles by chemical vapor deposition using a rotary furnace or rotary kiln, it is preferable to use an apparatus in which the core tube of a rotary furnace or rotary kiln is arranged horizontally and the core tube is rotated. The chemical vapor deposition treatment of the silicon oxide particles while rotating silicon oxide particles enables stable production without aggregation of the silicon oxide particles. The above-described apparatus is not limited as long as it has a furnace core tube capable of holding an atmosphere, a rotation mechanism for rotating the furnace core tube, and a heating mechanism capable of raising and maintaining the temperature. The above-described apparatus may be equipped with a raw material feeding mechanism (for example, a feeder) and a product recovery mechanism (for example, a hopper), depending on the purpose, and the furnace core tube may be inclined or equipped with a baffle plate in the furnace core tube in order to control the residence time of the raw material. The material of the furnace core tube is not particularly restricted, and a ceramic such as alumina or silicon carbide, a high-melting point metal such as molybdenum or tungsten, SUS, quartz, or the like can be selected as appropriate depending on the processing conditions and the purposes of treatment.

In a case in which plural particles in the heat-treated product obtained by the heat treatment form aggregates, a disintegration treatment may be further performed. In a case in which the adjustment of the mean particle diameter to an intended size is required, a pulverization treatment may further be performed.

(X-Ray Diffraction Peak Intensity Ratio)

The negative electrode active material has an X-ray diffractive peak intensity ratio ($P_{Si}/P_{SiO2}$) ranging from 1.0 to 2.6. The X-ray diffraction peak intensity ratio ($P_{Si}/P_{SiO2}$) is a ratio of an intensity of an X-ray diffraction peak at 2θ of from 27° to 29°, which is derived from Si, to an intensity of an X-ray diffraction peak at 2θ of from 20° to 25°, which is derived from $SiO_2$, when CuKα radiation having a wavelength of 0.15406 nm is used as a radiation source.

The ratio ($P_{Si}/P_{SiO2}$) of the intensities of the X-ray diffractive peaks of the negative electrode active material may be a value measured in a state where carbon, the organic substance, a conductive particle, or the like adhere to the silicon oxide particles, or a value measured in a state where these do not adhere to the silicon oxide particles.

Examples of the negative electrode active material having the ratio of the intensities of X-ray diffracted peaks ($P_{Si}/P_{SiO2}$) ranging from 1.0 to 2.6 include a negative electrode active material containing a silicon oxide particle having a structure in which crystallites of silicon are present in the silicon oxide.

The silicon oxide particle having a structure in which silicon crystallites are dispersed in silicon oxide can be produced, for example, by causing disproportionation reaction of silicon oxide ($2SiO \rightarrow Si+SiO_2$) to generate silicon crystallites in the silicon oxide particle. By controlling the degree of formation of silicon crystallites in the silicon oxide particle, the ratio of the intensities of the X-ray diffraction peaks can be controlled to a desired value.

An advantage of achieving the presence of silicon crystallites in the silicon oxide particle by way of the disproportionation reaction of silicon oxide can be considered as follows. The above-mentioned $SiO_x$ (x is $0<x\leq2$) tends to be inferior in the initial charge/discharge characteristics because lithium ions are trapped at the time of initial charge. This occurs because lithium ions are trapped by dangling bonds (unshared electron pair) of oxygen present in the amorphous $SiO_2$ phase. Therefore, it is considered that suppressing generation of dangling bonds of active oxygen atoms by reconstructing the amorphous $SiO_2$ phase by heat treatment is preferable from the viewpoint of improvement in charge-discharge characteristics.

In a case in which the ratio ($P_{Si}/P_{SiO2}$) of the intensities of the X-ray diffraction peaks of the negative electrode active material is 1.0 or more, the crystallites of silicon in the silicon oxide particle grow sufficiently and the ratio of $SiO_2$ does not become large, so that an initial discharge capacity is large and a decrease of high temperature storage characteristics due to an irreversible reaction tends to be suppressed. On the other hand, in a case in which $P_{Si}/P_{SiO2}$ is 2.6 or less, the crystallites of the generated silicon are not too large to relieve expansion and contraction, which tends to suppress a decrease in the initial discharging capacity. From the viewpoint of obtaining a negative electrode active material excellent in charge-discharge characteristics, the $P_{Si}/P_{SiO2}$ is preferably within the range of from 1.5 to 2.0.

The ratio ($P_{Si}/P_{SiO2}$) of the intensities of the X-ray diffracted peaks of the negative electrode active material can be controlled by, for example, the condition of the heat treatment for causing the disproportionation reaction of the silicon oxide. For example, by increasing the temperature of the heat treatment or increasing the heat treatment time, the generation and enlargement of silicon crystallites are promoted, and the ratio of the intensities of the X-ray diffraction peaks can be increased. On the other hand, by lowering the temperature of the heat treatment or shortening the heat treatment time, the generation of silicon crystallites can be suppressed, and the ratio of the intensities of the X-ray diffraction peaks can be reduced.

In a case in which the silicon oxide particle is prepared by disproportionation reaction of silicon oxide, silicon oxide to be used as a raw material may be obtained, for example, by a known sublimation technique in which a silicon monoxide gas produced by heating a mixture of silicon dioxide and a metal silicon is cooled and precipitated. Alternatively, it is commercially available as oxidized silicon, silicon monoxide or the like.

(Size of Silicon Crystallite)

The negative electrode active material preferably has a diffraction peak that is attributed to Si (111) in the X-ray diffraction spectra, and the size of silicon crystallites calculated from the diffraction peak is preferably within a range from 1.0 nm to 15.0 nm. Whether or not silicon crystallites are present in the silicon oxide particle may be observed, for example, by a powder X-ray diffraction (XRD) measurement. In a case in which silicon crystallites are present in the silicon oxide particle, a diffraction peak derived from Si (111) is observed near $2\theta=28.4°$ at a time of performing a powder X-ray diffraction (XRD) using a radiation source of the CuKα radiation having a wavelength of 0.15406 nm.

A size of the silicon crystallite is preferably from 2.0 nm to 10.0 nm, and more preferably from 3.0 nm to 8.0 nm. In a case in which the size of the silicon crystallite is 15.0 nm or less, the silicon crystallite is not apt to localize in a silicon oxide particle but rather apt to disperse in an entire of the silicon oxide particle. Therefore, lithium ions can diffuse easily in the silicon oxide particle so as to facilitate achievement of excellent discharge capacity. In a case in which the size of the crystallite is 1.0 nm or more, a reaction between a lithium ion and a silicon oxide can be well controlled so as to facilitate achievement of excellent charge and discharge efficiency.

The size of the silicon crystallite is a size of a single crystal of silicon included in the silicon oxide particle and can be determined using the Scherrer equation based on the half width of a diffraction peak near $2\theta=28.4°$ derived from Si (111) obtained by a powder X-ray diffraction analysis using a radiation source of the CuKα radiation having a wavelength of 0.15406 nm.

A method to generate the silicon crystallite in the silicon oxide particle is not particularly limited. For example, it can be generated by subjecting the silicon oxide particle to a heat treatment in a temperature range of from 700° C. to 1300° C. under an inert atmosphere to cause the disproportionation ($2SiO \rightarrow Si+SiO_2$). The heat treatment to cause disproportionation may be performed as the same process as that for the heat treatment to provide carbon to a surface of the silicon oxide particle.

The heat treatment conditions for causing the disproportionation reaction of the silicon oxide can be, for example, performance with the silicon oxide in an inert atmosphere in a temperature range of 700° C. to 1300° C., preferably in a temperature range of 800° C. to 1200° C. From the viewpoint of generating a silicon crystallite with a desired size, the heat treatment temperature is preferably over 900° C., and more preferably 950° C. or higher. The heat treatment temperature is preferably less than 1150° C., and more preferably 1100° C. or lower.

(Mean Aspect Ratio)

The negative electrode active material has a mean value of an aspect ratio (i.e., mean aspect ratio), which is represented by a ratio (S/L) of a major axis L and a minor axis S, of $0.45 \leq S/L \leq 1$.

In general, when silicon oxide is used as a negative electrode active material, a large volume change occurs due to insertion and desorption of lithium ions during charge and discharge. Therefore, when the charging and discharging is repeated, the silicon oxide particles are cracked and micronized, and the electrode structure of the negative electrode using the silicon oxide particles is also destroyed and the conductive path may be cut. In the present disclosure, by setting the mean aspect ratio of the negative electrode active material to be within the range of $0.45 \leq S/L \leq 1$, the difference in volume change amount between the expanded state and the contracted state as the electrode is averaged, and collapse of the electrode structure is suppressed. It is considered that as a result thereof conduction between adjacent particles becomes easy to be achieved even if the silicon oxide particles expand and contract.

The mean aspect ratio of the negative electrode active material is within the range of $0.45 \leq S/L \leq 1$, preferably within a range of $0.55 \leq S/L \leq 1$, and more preferably within a range of $0.65 \leq S/L \leq 1$. In a case in which the mean aspect ratio of the negative electrode active material is 0.45 or more, there is a tendency that the difference in volume change amount for each region due to expansion and contraction as an electrode is small, and the deterioration of cycle characteristics is suppressed.

The aspect ratio of the negative electrode active material is measured by an observation using a scanning electron microscope (Scanning Electron Microscope, SEM). The mean aspect ratio is calculated as an arithmetic mean value of the aspect ratios obtained by arbitrarily selecting 100 particles from an SEM image and measuring each of these particles.

The ratio (S/L) of the minor axis S to the major axis L of the measurement target particle means the ratio of the minor axis (minimum diameter)/major axis (maximum diameter) for a spherical particle, and the ratio of the minor axis (minimum diameter or minimum diagonal length)/major axis (maximum diameter or maximum diagonal length) for a hexagonal plate-shaped or disk-shaped particle in the projected image of the particle observed from the thickness direction (observed with a surface corresponding to the thickness facing the front surface) respectively.

In a case in which the negative electrode active material contains a conductive particle described below, the conductive particle is excluded from the target of measurement of the mean aspect ratio.

In a case in which the negative electrode active material is obtained through a heat treatment for a disproportionation reaction of silicon oxide, there may be a case that individual particles are agglomerated. It is meant that particles used in the calculation of the mean aspect ratio in this case are particles of the smallest unit (primary particles) that can exist alone as particles.

The value of the mean aspect ratio of the negative electrode active material can be adjusted by, for example, pulverizing conditions in manufacturing the negative electrode active material. A generally known pulverizer can be used for pulverizing the negative electrode active material, and a pulverizer which can apply mechanical energy such as shear force, impact force, compression force, frictional force or the like can be used without any particular limitation. Examples of the pulverizer include a pulverizer (ball mill, bead mill, vibration mill or the like) which pulverizes using impact force and friction force by kinetic energy of pulverizing media, a pulverizer (jet mill or the like) which pulverizes raw material particles by effects of impact and friction among particles caused by jetting high pressure gas of several or more atmospheric pressures from a jetting nozzle and accelerating the raw material particles by this jet air flow, and a pulverizer (hammer mill, pin mill, disc mill or the like) which pulverizes raw material particles by applying impact to the raw material particles by a high-speed rotating hammer, a pin, or a disc.

When the negative electrode active material is obtained through a pulverizing process, the particle size distribution may be adjusted by performing a classification process after pulverizing. A method of the classification is not particularly limited, and may be selected from dry classification, wet classification, sieving or the like. From the viewpoint of productivity, it is preferable to perform pulverization and classification collectively. For example, a coupling system of jet mill and cyclone allows the particles to be classified prior to re-agglomeration to conveniently obtain a particle size distribution having desired shape.

When necessary, for example, in a case in which the aspect ratio of the negative electrode active material cannot be adjusted to a desired range only by the pulverizing treatment, the negative electrode active material may be further subject to a surface modification treatment after the pulverization to adjust the aspect ratio. An apparatus for performing the surface modification treatment is not particularly limited. Examples thereof include mechanofusion systems, NOBILTA, hybridization systems and the like.

(Specific Surface Area Calculated by Nitrogen Adsorption)

A specific surface area calculated by nitrogen adsorption at 77 K of the negative electrode material is preferably from $0.1$ m$^2$/g to $10$ m$^2$/g, more preferably from $0.5$ m$^2$/g to $5.0$ m$^2$/g, further preferably from $1.0$ m$^2$/g to $4.0$ m$^2$/g, and particularly preferably from $1.0$ m$^2$/g to $3.0$ m$^2$/g. In a case in which the specific surface area of the negative electrode material is $10$ m$^2$/g or less, increase in the initial irreversible capacity of a lithium ion secondary battery produced therewith tends to be suppressed. Further, increase in the consumption of a binder for producing a negative electrode can be suppressed. In a case in which the specific surface area of the negative electrode material is $0.1$ m$^2$/g or more, the contact area of the negative electrode material with an electrolyte solution is sufficiently made and the charge/discharge efficiency tends to increase.

The specific surface area calculated from nitrogen adsorption at 77 K can be calculated using a BET method from an adsorption isotherm obtained from a nitrogen adsorption measurement at 77 K.

(Specific Surface Area and Moisture Adsorption Calculated from Moisture Adsorption)

The negative electrode active material preferably has a specific surface area calculated from moisture adsorption at 298 K of $6.5$ m$^2$/g or less, and more preferably $3.0$ m$^2$/g or less, and still more preferably $2.0$ m$^2$/g or less. In a case in which the specific surface area calculated from moisture adsorption at 298 K is $6.5$ m$^2$/g or less, a decomposition reaction occurring at an interface between the negative electrode active material and an electrolyte can be suppressed, which tends to prevent degradation of high temperature storage characteristics. The specific surface area calculated from moisture adsorption at 298 K may be $0.1$ m$^2$/g or more, or may be $0.5$ m$^2$/g or more.

The amount of adsorption of moisture up to a relative pressure of 0.95 at 298 K is preferably $8.5$ cm$^3$/g or less, and more preferably $6.5$ cm$^3$/g or less, and still more preferably $3.0$ cm$^3$/g or less. In a case in which the amount of adsorption of moisture up to a relative pressure of 0.95 at 298 K is $8.5$ cm$^3$/g or less, a decomposition reaction occurring at an interface between the negative electrode active material and an electrolyte can be suppressed, which tends to prevent degradation of high temperature storage characteristics. The amount of adsorption of moisture up to a relative pressure of 0.95 at 298 K may be $1.0$ cm$^3$/g or more, or may be $1.5$ cm$^3$/g or more.

The specific surface area calculated from moisture adsorption at 298 K can be calculated using a BET method from an adsorption isotherm obtained from a moisture adsorption measurement at 298 K. The amount of adsorption of moisture up to a relative pressure of 0.95 at 298 K can be calculated by measuring moisture adsorption up to a relative pressure of 0.95 at 298 K using a multipoint method.

(Specific Surface Area and Carbon Dioxide Adsorption Calculated from Carbon Dioxide Adsorption)

The negative electrode active material preferably has a specific surface area calculated from carbon dioxide adsorption at 273 K of 8.5 m$^2$/g or less, and more preferably 5 m$^2$/g or less, and still more preferably 1 m$^2$/g or less. In a case in which the specific surface area calculated from carbon dioxide adsorption at 273 K is 8.5 m$^2$/g or less, a decomposition reaction occurring at an interface between the negative electrode active material and an electrolyte can be suppressed, which tends to prevent degradation of high temperature storage characteristics. The specific surface area calculated from carbon dioxide adsorption at 273 K may be 0.01 m$^2$/g or more, or may be 0.1 m$^2$/g or more.

The amount of adsorption of carbon dioxide up to a relative pressure of 0.03 at 273 K is preferably 2 cm$^3$/g or less, and more preferably 0.5 cm$^3$/g or less, and still more preferably 0.1 cm$^3$/g or less. In a case in which the amount of adsorption of carbon dioxide up to a relative pressure of 0.03 at 273 K is 2 cm$^3$/g or less, a decomposition reaction occurring at an interface between the negative electrode active material and an electrolyte can be suppressed, which tends to prevent degradation of high temperature storage characteristics. The amount of adsorption of carbon dioxide up to a relative pressure of 0.03 at 273 K is 0.005 cm$^3$/g or more, or may be 0.01 cm$^3$/g or more.

The specific surface area calculated from carbon dioxide adsorption at 273 K can be calculated using a BET method from an adsorption isotherm obtained from a carbon dioxide adsorption measurement at 273 K. The amount of adsorption of carbon dioxide up to a relative pressure of 0.03 at 273 K can be calculated by measuring carbon dioxide adsorption up to a relative pressure of 0.03 at 273 K using a multipoint method.

(Ratio of Specific Surface Area Calculated from Moisture Adsorption to Specific Surface Area Calculated from Nitrogen Adsorption)

The negative electrode active material has a ratio ($S_{H2O}/S_{N2}$) of a specific surface area calculated from moisture adsorption at 298 K to a specific surface area calculated from nitrogen adsorption at 77 K is 0.60 or less, preferably 0.40 or less, and more preferably 0.30 or less. In a case in which the ratio ($S_{H2O}/S_{N2}$) is 0.60 or less, a decomposition reaction occurring at an interface between the negative electrode active material and an electrolyte can be suppressed, which tends to prevent expansion of the electrode and degradation of high temperature storage characteristics.

The specific surface area calculated from moisture adsorption at 298 K can be calculated using a BET method from an adsorption isotherm obtained from a moisture adsorption measurement at 298 K. The specific surface area calculated from nitrogen adsorption at 77 K can be calculated using a BET method from an adsorption isotherm obtained from a nitrogen adsorption measurement at 77 K. The ratio ($S_{H2O}/S_{N2}$) may be 0.01 or more, and may be 0.05 or more.

Usually, a hydrophilicity of a surface of a material can be evaluated by the above-described ratio ($S_{H2O}/S_{N2}$). A high ratio ($S_{H2O}/S_{N2}$) of the negative electrode active material in the disclosure means that the surface of the active material is hydrophilic.

Figure 2:
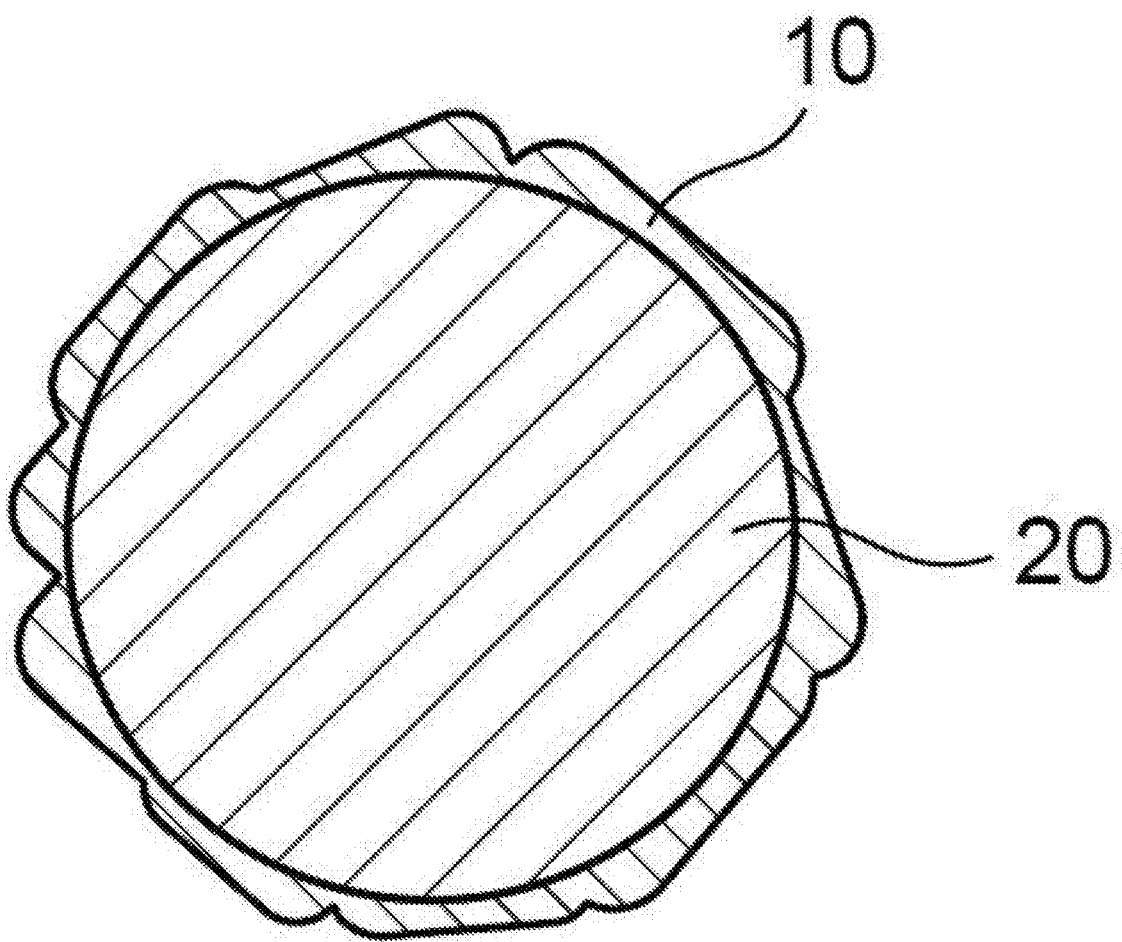
FIG. 2 is a schematic sectional view illustrating another example of a structure of a negative electrode active material.
Figure 3:
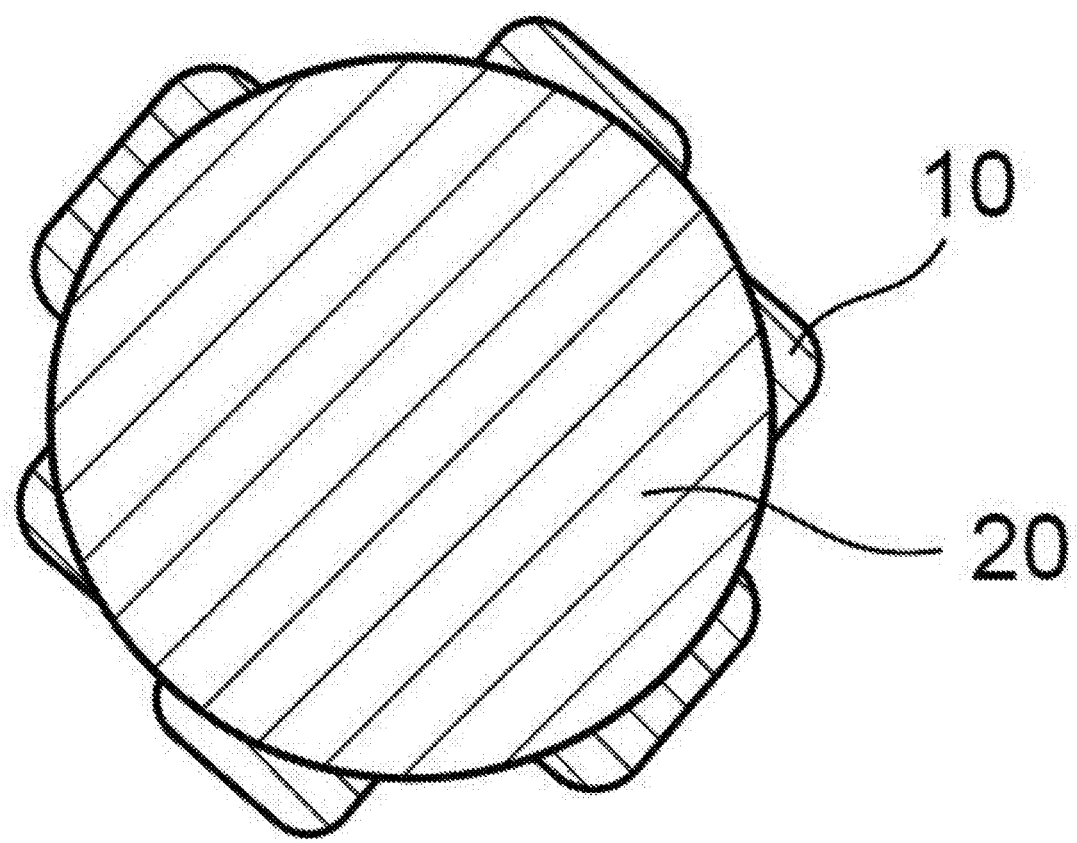
FIG. 3 is a schematic sectional view illustrating another example of a structure of a negative electrode active material.
Figure 4:
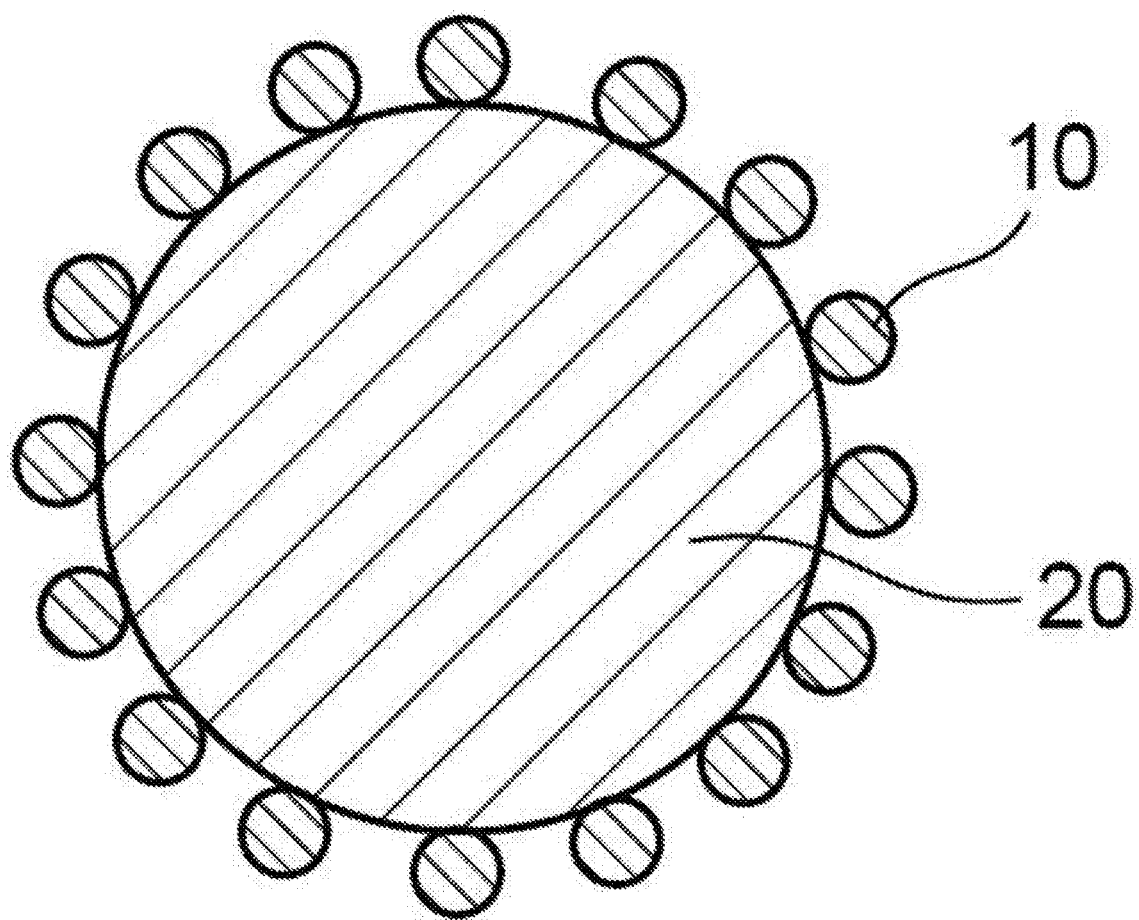
FIG. 4 is a schematic sectional view illustrating another example of a structure of a negative electrode active material.
Figure 5:
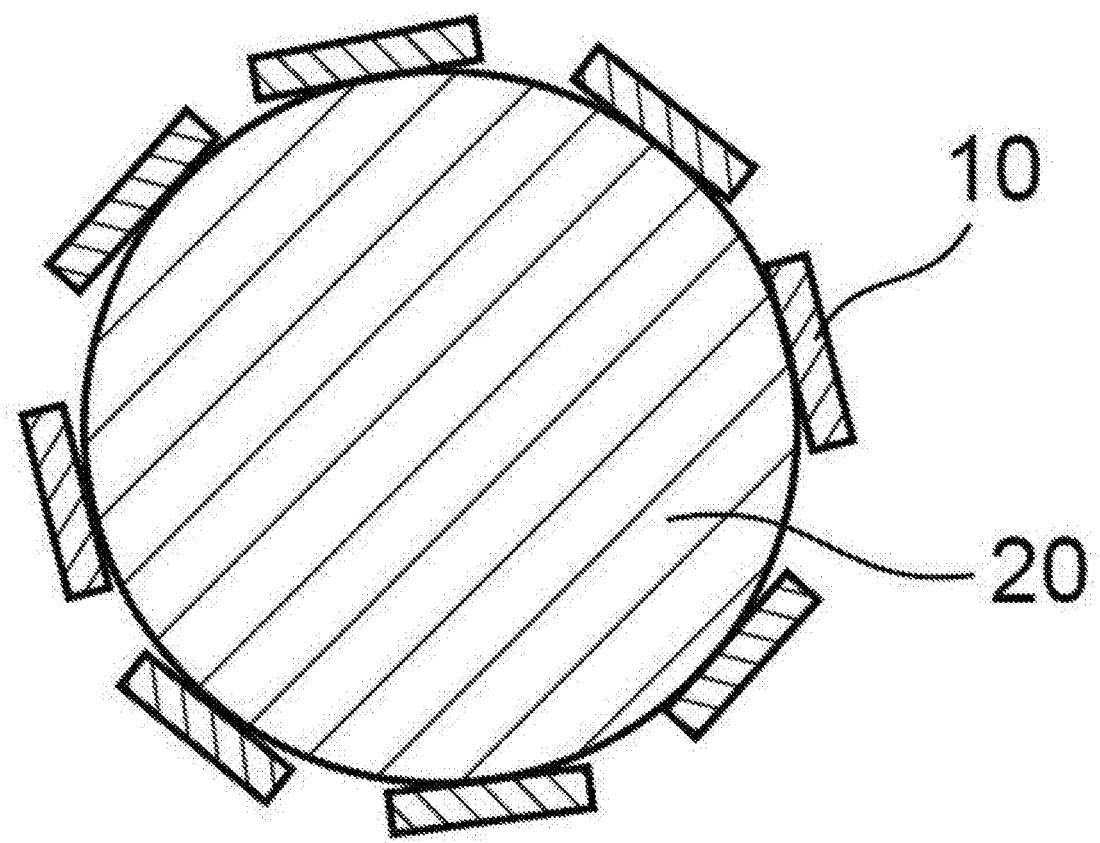
FIG. 5 is a schematic sectional view illustrating another example of a structure of a negative electrode active material.

Here, it is generally known that a surface of a silicon oxide is hydrophilic and that a surface of carbon is hydrophobic. In other words, a small ratio ($S_{H2O}/S_{N2}$) in the negative electrode active material in the disclosure means that carbon, which is hydrophobic, sufficiently covers the entire surface of a silicon oxide, which is hydrophilic, as shown in FIG. 1 or FIG. 2, as described below. On the other hand, a large ratio ($S_{H2O}/S_{N2}$) means that carbon is partially present on the surface of a silicon oxide and the surface of the silicon oxide is partially exposed, as shown in FIGS. 3 to 5, as described below. Accordingly, by evaluating a ratio ($S_{H2O}/S_{N2}$), the carbon coverage (degree of exposure of a silicon oxide) of the negative electrode active material in the disclosure can be easily evaluated.

(Volume Mean Particle Size)

A volume mean particle diameter of the negative electrode active material is not particularly limited. For example, the volume mean particle diameter is preferably from 0.1 μm to 20 μm, and more preferably 0.5 μm to 10 μm. The volume mean particle diameter of the negative electrode active material is D50% which is a particle diameter corresponding to 50% cumulative volume from a small particle diameter side in a volume-based particle size distribution curve. In a case in which the volume mean particle diameter is 0.1 μm or more, since the specific surface area does not become too large, the increase in contact area with the electrolyte is suppressed, and the charge/discharge efficiency tends not to decrease. In a case in which the volume mean particle diameter is 20 μm or less, unevenness on the electrode surface is less likely to occur, which tends to prevent a battery short circuit. Furthermore, since the diffusion distance of lithium from the surface of the particles to the interior does not become too long, the acceptance of lithium is less likely to be reduced and charge/discharge efficiency is less likely to be reduced.

For the measurement of the volume mean particle diameter, a known method such as a laser diffraction particle size distributor can be employed.

The negative electrode active material preferably has a ratio (D10%/D90%) of 0.1 or more, more preferably 0.2 or more, and still preferably 0.3 or more, in which D90% is a particle diameter corresponding to 90% cumulative from a smaller particle diameter side in a cumulative volume distribution curve obtained by a laser diffraction/scattering method and D10% is a particle diameter corresponding to 10% cumulative from a smaller particle diameter side in the cumulative volume distribution curve. In a case in which the value of D10%/D90% of the negative electrode active material is 0.1 or more, a difference in an amount of change in expansion and contraction of an electrode becomes small, and deterioration of the cycle characteristic tends to be suppressed. The ratio D10%/D90% of the negative electrode active material may be 1.0 or less, preferably 0.8 or less, and more preferably 0.6 or less.

The value of D10%/D90% of the negative electrode active material is an index relating to the width and narrowness of a particle size distribution of the negative electrode active material, and a large value of D10%/D90% means that the particle size distribution of the negative electrode active material is narrow.

The D90% and D10% of the negative electrode active material are respectively obtained as a particle diameter when a cumulative volume from a small particle diameter side is 90% and as a particle diameter when a cumulative volume from a small particle diameter side is 10%, in a volume-based particle size distribution measured by a laser diffraction/scattering method using a sample in which the negative electrode active material is dispersed in water.

(Organic Substance)

The negative electrode active material in the present disclosure may be coated with an organic substance. In a case in which the negative electrode active material is coated by the organic substance, the initial discharge capacity, the initial charge/discharge efficiency, and the recovery rate after charge/discharge tend to be further improved. This is considered to be because coating an organic substance causes reduction of the specific surface area of the negative electrode active material to result in suppression of the reaction of the negative electrode active material with the electrolyte solution. The organic substance contained in the negative electrode active material may be only one kind or two or more kinds thereof.

A content of the organic substance is preferably from 0.1% by mass to 5.0% by mass with respect to a total mass of the negative electrode active material. In a case in which the content of the organic substance is within the above range, an effect of improving the recovery rate after charging/discharging tends to be sufficiently obtained while suppressing the decrease in conductivity. The content of the organic substance with respect to the total mass of the negative electrode active material is more preferably from 0.2% by mass to 3.0% by mass and further preferably from 0.3% by mass to 1.0% by mass.

Whether or not the negative electrode active material contains the organic substance can be observed by, for example, heating the negative electrode active material which is sufficiently dried to a temperature equal to or higher than the temperature at which the organic substance decomposes but lower than a temperature at which carbon decomposes, for example, 300° C., and measuring a mass of the negative electrode active material after the organic substance decomposes. Specifically, it can be determined that the negative electrode active material contains the organic substance if a rate of change in mass represented by $\{(A-B)/A\} \times 100$ is 0.1% or more, provided that the mass of the negative electrode active material before heating is A(g) and the mass of the negative electrode active material after heating is B(g).

The rate of change in mass is preferably from 0.1% to 5.0%, and more preferably 0.3% to 1.0%. In a case in which the rate of change is 0.1% or more, a sufficient quantity of the organic substance exists on a surface of the SiO—C particle, so that the effects due to inclusion of the organic substance tend to be sufficiently obtained.

A kind of the organic substance is not particularly limited. For example, at least one selected from the group consisting of a starch derivative having $C_6H_{10}O_5$ as a unit structure thereof, a viscous polysaccharide having $C_6H_{10}O_5$ as a unit structure thereof, a water-soluble cellulose derivative having $C_6H_{10}O_5$ as a unit structure thereof, polyuronides, and a water-soluble synthetic resin can be mentioned.

Specific examples of the starch derivative having $C_6H_{10}O_5$ as a unit structure thereof include hydroxyalkyl starches such as acetic acid starch, phosphate starch, carboxymethyl starch, and hydroxyethyl starch. Specific examples of the viscous polysaccharide having $C_6H_{10}O_5$ as a unit structure thereof include pullulan, dextrin, and the like. Specific examples of the water-soluble cellulose derivatives having $C_6H_{10}O_5$ as a unit structure thereof include carboxymethylcellulose, methylcellulose, hydroxyethylcellulose, hydroxypropylcellulose and the like. Examples of the polyuronide include pectic acid, alginic acid and the like. Examples of the water-soluble synthetic resin include a water-soluble acrylic resin, a water-soluble epoxy resin, a water-soluble polyester resin, a water-soluble polyamide resin and the like, and more specific examples thereof include polyvinyl alcohol, polyacrylic acid, polyacrylic acid salt, polyvinyl sulfonic acid, polyvinyl sulfonic acid salt, poly 4-vinyl phenol, poly 4-vinyl phenol salt, polystyrene sulfonic acid, polystyrene sulfonic acid salt, polyaniline sulfonic acid and the like. The organic substance may be used in a form of a metal salt, an alkylene glycol esters or the like.

From the viewpoint of reducing the specific surface area of the negative electrode active material, it is preferable that the organic substance is in a state in which a part or an entire of a surface of the SiO—C particle (in a case in which the conductive particle to be described below is present on the surface of the SiO—C particle, the surface thereof) is coated.

There are no particular restrictions on the manner in which the organic substance is present on a part or an entire of the surface of the SiO—C particle. For example, the organic substance can be attached to the SiO—C particle by introducing the SiO—C particle into a liquid in which the organic substance is dissolved or dispersed and agitating the liquid as required. Thereafter, the SiO—C particle to which the organic substance adheres are taken out from the liquid and dried as required, whereby SiO—C particle to which the organic substance adheres can be obtained.

In the above method, a temperature of the liquid at the time of agitating is not particularly limited, and can be selected, for example, from 5° C. to 95° C. A temperature at the time of drying is not particularly limited, and can be selected, for example, from 50° C. to 200° C. A content of the organic substance in the solution is not particularly limited, and can be selected, for example, from 0.1% by mass to 20% by mass.

(Conductive Particle)

The negative electrode active material in the present disclosure (SiO based negative electrode active material) disclosure may contain a conductive particle if needed. In a case in which the negative electrode active material contains the conductive particle, conduction can be easily made by the conductive particles coming into contact with each other even if expansion and contraction of the silicon oxide particles occur. In addition, the resistance value of the entire negative electrode active material tends to be reduced. As a result, a decrease in capacity due to repetition of charge and discharge is suppressed, and the cycle characteristics tend to be satisfactorily maintained.

From the viewpoint of ensuring electrical continuity via contacts of the negative electrode active materials with each other, it is preferable that the conductive particle exists on the surface of the SiO—C particle.

A kind of the conductive particle is not particularly limited. For example, at least one selected from the group consisting of granular graphite and carbon black is preferable, and granular graphite is preferable from the viewpoint of improving cycle characteristics. Examples of the granular graphite include particles of artificial graphite, particles of natural graphite, and particles of MC (mesophase carbon). Examples of the carbon black include acetylene black, Ketjen black, thermal black, furnace black and the like, and acetylene black is preferable from the standpoint of conductivity.

The granular graphite preferably has higher crystallinity than carbon present on the surface of the silicon oxide particles from the viewpoint of improving both the battery capacity and the charge/discharge efficiency. Specifically, the particulate graphite preferably has a mean interplanar spacing ($d_{002}$) measured according to the Gakushin method of from 0.335 nm to 0.347 nm, more preferably from 0.335 nm to 0.345 nm, more preferably from 0.335 nm to 0.340 nm, and particularly preferably from 0.335 nm to 0.337 nm. In a case in which the mean interplanar spacing of the granular graphite is 0.347 nm or less, the crystallinity of the granular graphite is high, and both the battery capacity and the charge/discharge efficiency tend to be improved. On the other hand, since the theoretical value of a mean interplanar spacing of the graphite crystal is 0.335 nm, in a case in which the mean interplanar spacing of the granular graphite is close to this value, both the battery capacity and the charge/discharge efficiency tend to be improved.

A shape of the granular graphite is not particularly limited and it may be flat graphite or spherical graphite. From the standpoint of improving cycle characteristics, flat graphite is preferable.

Flat graphite in the present disclosure means graphite an aspect ratio of which is not 1, i.e., the length of the minor axis and the length of the major axis thereof are not equal. Examples of the flat graphite include graphite having a shape of a scale, a flake, a lump or the like.

An aspect ratio of the conductive particle is not particularly limited, and a mean value of the aspect ratio is preferably 0.3 or less, and more preferably 0.2 or less, from the viewpoint of easiness of ensuring the conduction between the conductive particles and improvement in cycle characteristics.

The aspect ratio of the conductive particle is a value measured by observation with a SEM. Specifically, it is a value calculated as B/A provided that a length in the major axis direction is A and a length in the minor axis direction (in the case of flat graphite, it means the length in the thickness direction) is B for each of 100 arbitrarily selected conductive particles in a SEM image. The mean value of the aspect ratio is an arithmetic mean value of the aspect ratio of 100 conductive particles.

The conductive particle may be a primary particle (single particle) or a secondary particle (granulated particle) formed from a plurality of primary particles. The flat graphite may be a porous graphite particle.

A content of the conductive particle with respect to a total mass of the negative electrode active material is preferably from 1.0% by mass to 10.0% by mass, more preferably 2.0% by mass to 9.0% by mass, and still more preferably 3.0% by mass to 8.0% by mass, from the viewpoint of improving the cycle characteristics.

The content of the conductive particle can be determined by, for example, a high-frequency furnace combustion-infrared absorption spectrometry. In the high-frequency furnace combustion-infrared absorption spectrometry, for example, a sulfur/carbon simultaneous analyzer (CSLS600, Japan LECO Co., Ltd.) can be used. Since this measurement provides a result including a content of carbon in the SiO—C particle, the content of carbon may be separately measured and subtracted from the obtained content.

A method for manufacturing the negative electrode active material containing the conductive particle is not particularly limited, and may include a wet method and a dry method.

Examples of a method of producing the negative electrode active material containing a conductive particle by a wet method include a method which includes adding the SiO—C particle to a particle dispersion liquid in which conductive particles are dispersed in a dispersion medium, agitating the particle dispersion liquid, and then removing the dispersion medium using a dryer or the like. The dispersion medium used therein is not particularly limited, and water, an organic solvent or the like can be used. The organic solvent may be a water-soluble organic solvent such as an alcohol or may be a water-insoluble organic solvent. The dispersing medium may contain a dispersant from the viewpoint of enhancing dispersibility of the conductive particles and increasing uniform adherence of the conductive particles to the surface of the SiO—C particle. The dispersant can be selected according to the type of dispersion medium used. For example, in a case in which the dispersion medium is a water-based medium, carboxymethylcellulose is preferable as the dispersant from the viewpoint of dispersion stability.

Examples of a method of producing the negative electrode active material containing the conductive particle by the dry method include a method which includes adding the conductive particle together with a carbon source for carbon when the carbon source is applied to a surface of the silicon oxide particle. Specific examples thereof include a method including mixing the carbon source and the conductive particle with the silicon oxide particle and applying mechanical energy (for example, a mechanochemical treatment).

If necessary, classification of the obtained negative electrode active material may be further performed. The classification process can be performed using a sieving machine or the like.

An example of a configuration of the negative electrode active material is explained hereinafter with referring to the Figures.

FIGS. 1 to 5 are schematic sectional views illustrating examples of a structure of the negative electrode active material, respectively. In FIG. 1, carbon 10 covers an entire surface of a silicon oxide particle 20. In FIG. 2, carbon 10 covers an entire surface of a silicon oxide particle 20, although a thickness thereof is non-uniform. In FIG. 3, carbon 10 is present on a part of a surface of a silicon oxide particle 20, and thus the surface of the silicon oxide particle 20 is partially exposed. In FIG. 4, particles of carbon 10 having a smaller particle size than the silicon oxide particle 20 are present on a surface of a silicon oxide particle 20. FIG. 5 is a variant of FIG. 4, in which the particle of carbon 10 is scale-shaped. In FIGS. 1 to 5, a shape of the silicon oxide particle 20 is schematically represented as spherical (circle as a cross-sectional shape), but the shape may be spherical, block-shaped, scale-shaped, polygonal (angular shape) in cross-sectional shape, or the like.

Figure 6A:
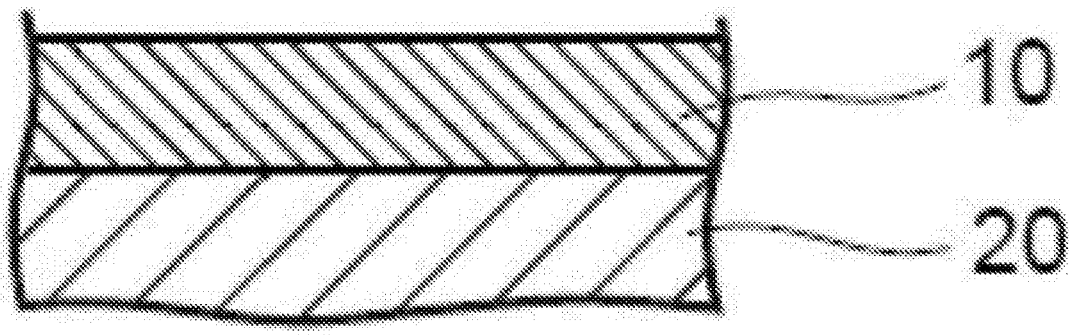
FIG. 6A is an enlarged schematic sectional view of a portion of the negative electrode active material shown in FIGS. 1 to 3, illustrating an aspect of the state of carbon 10 in the negative electrode active material.
Figure 6B:
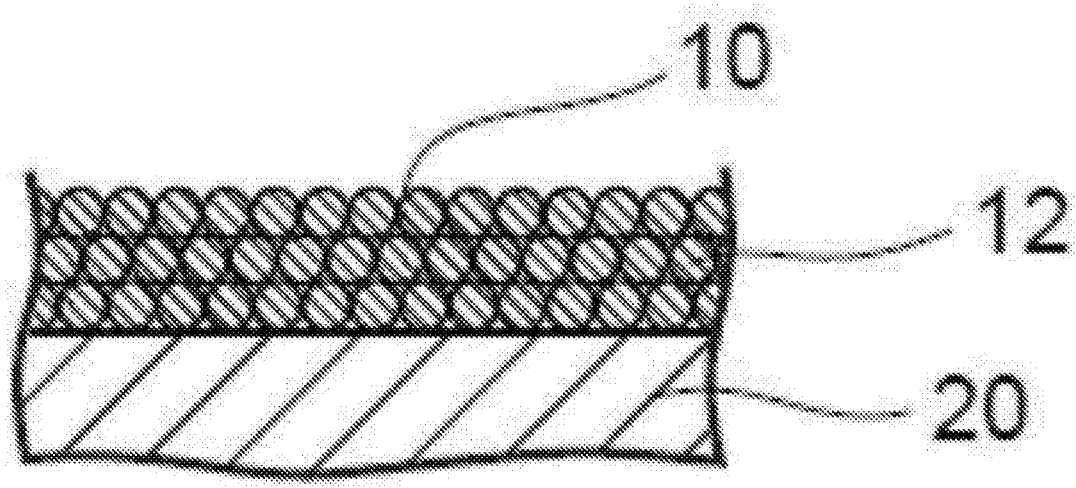
FIG. 6B is an enlarged schematic sectional view of a portion of the negative electrode active material shown in FIGS. 1 to 3, illustrating another aspect of the state of carbon 10 in the negative electrode active material.

Each of FIGS. 6A and 6B is an enlarged cross sectional view schematically illustrating a portion of the negative electrode active material shown in FIGS. 1 to 3. FIG. 6A illustrates an embodiment of a state of the carbon 10 in the negative electrode active material, and FIG. 6B illustrates another embodiment of the state of the carbon 10 in the negative electrode active material. Regarding FIGS. 1 to 3, carbon 10 may be in a state in which it forms a continuous layer as shown in FIG. 6A, or may be in a state of carbon granules 12, which are granules formed of the carbon 10, as shown in FIG. 6B. In FIG. 6B, while the granules 12 formed of the carbon 10 are shown in the state in which the outlines thereof are remained, the granules 12 may be connected with one another. When the granules 12 are connected with one another, the carbon 10 may be in a state in which, as shown in FIG. 6A, it forms a continuous layer, which may include a void in a part thereof.

In a case in which carbon 10 is particulate, particles of carbon 10 may be partially present on the surface of silicon oxide particle 20, and the surface of silicon oxide particle 20 may not be covered with particles of carbon 10 in part as shown in FIG. 4, or particles of carbon 12 may be present on the entire surface of silicon oxide particle 20, as shown in FIG. 6B.

If necessary, the negative electrode active material of the present disclosure (SiO-based negative electrode active material) may be used in combination with a carbon-based negative electrode active material conventionally known as an active material for a negative electrode of a lithium ion secondary battery. An effect of improving the charge and discharge efficiency, an effect of improving the cycle characteristics, an effect of suppressing the expansion of the electrode and the like are obtained depending on a kind of a carbon-based negative electrode active material used in combination. The carbon-based negative electrode active material to be used in combination with the negative electrode active material of the present disclosure may be only one kind or two or more kinds thereof.

A general carbon material known as a negative electrode active material for a lithium ion secondary battery may be used as the carbon-based negative electrode active material. Examples of the carbon-based negative electrode active material include a negative electrode active material formed of a carbon material such as: a natural graphite such as flake-shaped natural graphite or spherical natural graphite obtained by spheroidizing flake-shaped natural graphite; an artificial graphite; or an amorphous carbon. The carbon-based negative electrode active material may have carbon (the carbons described above) present on a part of the surface thereof or the entire surface thereof.

In a case in which the negative electrode active material of the present disclosure is used in combination with the carbon-based negative electrode active material, a ratio (A:B) of the negative electrode active material of the present disclosure (A) to the carbon-based negative electrode active material (B) can be appropriately adjusted in accordance with the purpose. For example, from the viewpoint of an effect of suppressing the expansion of the electrode, the ratio is preferably from 0.1:99.9 to 20:80, more preferably from 0.5:99.5 to 15:85, and still more preferably from 1:99 to 10:90, based on the mass.

<Negative Electrode for Lithium Ion Secondary Battery>

A negative electrode for a lithium ion secondary battery (hereinafter, sometimes abbreviated to a "negative electrode") of the present disclosure includes: a current collector; and a negative electrode material layer that is provided on or above the current collector and that includes the above-described negative electrode active material.

The negative electrode may be produced, for example, by forming a negative electrode material layer on or above a current collector using a composition containing the negative electrode active material described above.

Examples of the composition containing the negative electrode active material include a mixture of an organic binder, a solvent, a thickener, an electroconductive auxiliary material, a carbon-based negative electrode active material, and/or the like in addition to the negative electrode active material.

Specific examples of the organic binder include styrene-butadiene copolymers; (meth)acrylic copolymers obtained by copolymerization of an ethylenic unsaturated carboxylic acid ester (such as methyl(meth)acrylate, ethyl(meth)acrylate, butyl(meth)acrylate, (meth)acrylonitrile, or hydroxyethyl(meth)acrylate) and an ethylenic unsaturated carboxylic acid (such as acrylic acid, methacrylic acid, itaconic acid, fumaric acid, or maleic acid); and polymer compounds such as polyvinylidene fluoride, polyethylene oxide, polyepichlorohydrin, polyphosphazene, polyacrylonitrile, polyimide, or polyamide imide. Here, the term "(meth)acrylate" means "acrylate" and "methacrylate" corresponding thereto. The same applies to "(meth)acrylic copolymer" and other similar expressions. The organic binder may be one dispersed or dissolved in water, or one dissolved in an organic solvent such as N-methyl-2-pyrrolidone (NMP). Only one kind of the organic binder may be used, or alternatively, a combination of two or more kinds of the organic binder may be used.

In view of adhesiveness, among the organic binders, an organic binder having polyacrylonitrile, polyimide, or polyamide imide as a main skeleton thereof is preferable, and from the viewpoints of a low heat treatment temperature during the production of a negative electrode and excellent electrode flexibility, an organic binder having polyacrylonitrile as a main skeleton thereof is more preferable. Examples of the organic binder having polyacrylonitrile as a main skeleton thereof include one in that an acrylic acid for imparting adhesiveness and a straight chain ether group for imparting flexibility are added to a polyacrylonitrile skeleton.

A content of the organic binder in a negative electrode material layer is preferably from 0.1% by mass to 20% by mass, more preferably from 0.2% by mass to 20% by mass, and still more preferably from 0.3% by mass to 15% by mass. In a case in which the content of the organic binder in a negative electrode material layer is 0.1% by mass or more, excellent adhesiveness can achieved, and destruction of a negative electrode by expansion and constriction in charging and discharging tends to be suppressed. Meanwhile, in a case in which the content is 20% by mass or less, increase of electrode resistance tends to be suppressed.

Specific examples of the thickener include carboxymethyl cellulose, methylcellulose, hydroxymethyl cellulose, ethyl cellulose, polyvinyl alcohol, polyacrylic acid (polyacrylate), oxidized starch, phosphorylated starch, casein and the like. Only one kind of the thickener may be used, or alternatively, a combination of two or more kinds of the thickener may be used.

Specific examples of the solvent include N-methylpyrrolidone, dimethyl acetamide, dimethylformamide, γ-butyrolactone and the like. Only one kind of the solvent may be used, or alternatively, a combination of two or more kinds of the solvent may be used.

Specific examples of the electroconductive auxiliary material include carbon black, acetylene black, an oxide having electrical conductivity, a nitride having electrical conductivity and the like. Only one kind of the electroconductive auxiliary material may be used, or alternatively, a combination of two or more kinds of the electroconductive auxiliary material may be used. A content of the electroconductive auxiliary material is preferably from 0.1% by mass to 20% by mass with respect to the negative electrode material layer.

Examples of a material of the current collector include aluminum, copper, nickel, titanium, stainless steel, a porous metal (a foamed metal), and a carbon paper. Examples of a shape of the current collector include a foil form, a perforated foil form, and a mesh form.

Examples of a method of forming the negative electrode material layer on the current collector using the composition containing the negative electrode active material include: a method including applying a coating liquid including the negative electrode active material to the current collector, removing therefrom volatile substances such as a solvent, and subjecting the resultant to press-forming; and a method including integrating the negative electrode material layer which is made in a sheet-like shape, pellet-like shape or the like and the current collector; and the like.

Examples of the method of applying the coating liquid to the current collector include a metal mask printing method, an electrostatic coating method, a dip coating method, a spray coating method, a roll coating method, a doctor blade method, a gravure coating method, and a screen printing method. A pressure treatment after the application may be performed by a flat-plate press, a calender roll, or the like.

Integration of the negative electrode material layer and the current collector may be carried out by rolling, pressing, or a combination thereof.

The negative electrode material layer formed on the current collector or the negative electrode layer integrated with the current collector may be subjected to a heat treatment which depends on the organic binder used. For example, in a case in which an organic binder having a polyacrylonitrile as its main skeleton is used, the heat treatment is preferably carried out at a temperature of from 100° C. to 180° C., and in a case in which an organic binder having a polyimide or polyamide-imide as its main skeleton is used, the heat treatment is preferably carried out at a temperature of from 150° C. to 450° C.

By the heat treatment, the solvent is removed, the strength is highly intensified through the curing of the organic binder, and the adhesiveness between the negative electrode active materials and the adhesiveness between the negative electrode active material and the current collector can be improved. These heat treatments are preferably carried out in an inert atmosphere, such as helium, argon, or nitrogen, or in a vacuum atmosphere, in order to prevent oxidization of the current collector during the treatment.

The negative electrode layer may preferably be pressed (pressure treatment) before the heat treatment. By the pressure treatment, its electrode density can be controlled. The electrode density is preferably from 1.25 $g/cm^3$ to 1.9 $g/cm^3$, more preferably from 1.5 $g/cm^3$ to 1.85 $g/cm^3$, and still more preferably from 1.6 $g/cm^3$ to 1.8 $g/cm^3$. The higher the electrode density is, the more the volumetric capacity of the negative electrode tends to be improved and further the adhesiveness between negative electrode active materials and the adhesiveness between the negative electrode active material and the current collector tends to be improved.

<Lithium Ion Secondary Battery>

A lithium ion secondary battery according to the present disclosure includes: a positive electrode; the negative electrode described above; and an electrolyte.

The lithium ion secondary battery may be prepared by, for example, oppositely disposing in a cell casing the negative electrode and the positive electrode with a separator therebetween, and injecting therein an electrolytic solution obtained by dissolving an electrolyte to an organic solvent.

In the lithium ion secondary battery of the present disclosure, a solid electrolyte may be used as an electrolyte. Since a solid electrolyte can also serve as a separator, when a solid electrolyte is used as an electrolyte, a lithium ion secondary battery does not need to use a separator.

The positive electrode may be obtained similarly as the negative electrode, by forming a positive electrode material layer on the surface of a current collector. As a current collector for the positive electrode, a current collector similar to one usable for the negative electrode may be used.

A material to be used for the positive electrode (also referred to as a "positive electrode material") may be any compound as long as it enables doping or intercalation of a lithium ion, and examples thereof include lithium cobaltate ($LiCoO_2$), lithium nickelate ($LiNiO_2$), and lithium manganate ($LiMnO_2$).

The positive electrode may be produced by, for example, preparing a positive electrode coating liquid by mixing the positive electrode material, an organic binder such as polyvinylidene fluoride, and a medium such as N-methyl-2-pyrrolidone or γ-butyrolactone, applying the positive electrode coating liquid to at least one surface of a current collector such as aluminum foil, and removing the medium by drying, followed by, if necessary, a pressure treatment.

An electroconductive auxiliary material may be added to the positive electrode coating liquid. Examples of the electroconductive auxiliary material include carbon black, acetylene black, an oxide having electrical conductivity or a nitride having electrical conductivity. Only one kind of the electroconductive auxiliary material may be used, or alternatively, a combination of two or more kinds of the electroconductive auxiliary material may be used.

Examples of the electrolyte include $LiPF_6$, $LiClO_4$, $LiBF_4$, $LiClF_4$, $LiAsF_6$, $LiSbF_6$, $LiAlO_4$, $LiAlCl_4$, $LiN(CF_3SO_2)_2$, $LiN(C_2F_5SO_2)_2$, $LiC(CF_3SO_2)_3$, LiCl, and LiI.

Examples of the organic solvent which dissolves the electrolyte include propylene carbonate, ethylene carbonate, diethyl carbonate, ethyl methyl carbonate, vinyl carbonate, γ-butyrolactone, 1,2-dimethoxyethane, and 2-methyltetrahydrofuran.

Examples of the separator include a paper separator, a polypropylene separator, a polystyrene separator, and a glass fiber separator.

A method of producing the lithium ion secondary battery is not particularly limited. For example, a cylindrical lithium ion secondary battery may be produced by the processes below. First, two electrodes of the positive electrode and the negative electrode are wound together with the separator placed therebetween. The obtained wound group in a spiral shape is inserted in a cell casing, and a tab terminal, which has been welded to a current collector of the negative electrode in advance, is welded to the bottom of the cell casing. An electrolytic solution is introduced into the obtained cell casing, and a tab terminal, which has been welded to a current collector of the positive electrode in advance, is welded to the lid of the cell casing. The lid is arranged on the top of the cell casing with an insulating gasket disposed therebetween, and the portion at which the lid contacts with the cell casing are swaged so as to seal them, thereby obtaining a lithium ion secondary battery.

The shape of the lithium ion secondary battery is not particularly limited, and examples thereof include a paper lithium ion secondary battery, a button lithium ion secondary battery, a coin lithium ion secondary battery, a layered lithium ion secondary battery, a cylindrical lithium ion secondary battery, and a rectangular lithium ion secondary battery.

The negative electrode active material according to the present disclosure is not limited to an application for a lithium ion secondary battery, and it may be applied generally to an electrochemical apparatus employing lithium-ion intercalation/deintercalation as a charge and discharge mechanism.

EXAMPLES

Hereinafter, the embodiments are described more specifically with reference to Examples, but the embodiments are not limited to the examples. Here, "%" is based on mass unless otherwise specified.

Example 1

(Preparation of Negative Electrode Active Material)

Oxidized silicon having a bulk-shape (Kojundo Chemical Lab. Co., Ltd, standard 10 mm to 30 mm square) was coarsely ground in a mortar, thereby obtaining silicon oxide particles. The silicon oxide particles were further pulverized with a jet mill (LABO TYPE, manufactured by Nippon Pneumatic Mfg. Co., Ltd.), and then the particle diameter thereof was regulated using a 300-M (300-mesh) test screen, thereby obtaining silicon oxide particles having a volume mean particle diameter (D50%) of 5 μm. The mean particle diameter was measured by a method shown below.

<Measurement of Volume Mean Particle Diameter>

The measurement sample (5 mg) was added to a 0.01% by mass aqueous solution of surfactant (ETHOMEEN T/15, Lion Corporation), and the mixture was dispersed using a vibrational stirrer. The obtained dispersion was placed in a sample vessel of a laser diffraction particle size distribution measurement apparatus (SALD 3000J, Shimadzu Corporation), and measurement was carried out with a laser diffractometry method while circulating using a pump under an ultrasonic treatment. The measurement conditions are shown below. A particle diameter at which a cumulative volume reached 50% (D50%) in the obtained particle size distribution was defined as a mean particle diameter. In the following Examples, the measurements of the mean particle diameters were performed in a similar manner.

Light source: Red-color semiconductor laser (690 nm)
Absorbance: 0.10 to 0.15
Refractive index: 2.00 to 0.20

A carbon film was formed on the surface of silicon oxide particles by chemical vapor deposition on silicon oxide particles with a volume mean particle diameter (D50%) of 5 μm, obtained after grinding process of silicon oxide, using the following conditions.

1000 g of silicon oxide particles were prepared in a batch heating furnace (rotary kiln furnace). Next, the temperature was raised to 950° C. at 300° C./hour and held at 950° C., and then a mixture of acetylene gas (carbon source) and nitrogen gas flowed in at 10 L/min (partial pressure of acetylene gas: 10%) for 2 hours to carry out a chemical deposition treatment. After the treatment, the temperature was lowered, and a product of the chemical deposition treatment was obtained. The above-described heat treatment was carried out under the conditions where the disproportionation reaction of silicon oxides occurred.

The obtained heat-treated product was ground in a mortar, and further subjected to sieving with a 300-M (300-mesh) test screen, thereby obtaining a negative electrode active material (SiO—C particle), in which carbon covers surfaces of the silicon oxide particles. A volume mean particle diameter (D50%) of the negative electrode active material was measured in a similar manner to that for the silicon oxide particles. Further, D10% and D90% were measured, and a value of D10%/D90% were calculated therefrom.

<Measurement of Carbon Content>

A content of carbon in the negative electrode active material was measured by a high-frequency furnace combustion-infrared absorption spectrometry. The high-frequency furnace combustion-infrared absorption spectrometry is an analysis method in which a sample is heated and combusted in a high-frequency furnace under oxygen stream to convert carbon and sulfur in the sample into $CO_2$ and $SO_2$, respectively, and the products are quantified with an infrared absorption method. The measurement apparatus, the measurement condition, and the like are as follows.

Apparatus: sulfur/carbon simultaneous analyzer (CSLS600, LECO Japan Corporation)
Frequency: 18 MHz
High-frequency output: 1600 W
Sample mass: approximately 0.05 g
Analysis time: use in auto mode of the set mode of the apparatus
Combustion improver: Fe+W/Sn
Standard sample: LECO 501-024 (C: 3.03%±0.04, S: 0.055%±0.002) 97
Number of measurement: two times (a value of a content ratio shown in Table is a mean value of two measurements)

<Measurement of Size of Silicon Crystallite>

A size of a silicon crystallite was measured by measuring an intensity of an X-ray diffraction peak of the negative electrode active material using a powder X-ray diffractometer (MULTIFLEX (2 kW), Rigaku Corporation). Specifically, it was determined by a Scherrer equation based on a half-value width of a peak at 2θ=about 28.4° derived from a crystal face of Si (111). The measurement condition is as follows.

Radiation source: CuKα radiation (wavelength: 0.15406 nm)
Measurement range: 2θ=10° to 40°
Step width of sampling: 0.02°
Scan speed: 1°/min
Tube current: 40 mA
Tube voltage: 40 kV
Divergence slit: 1°
Scatter slit: 1°
Light receiving slit: 0.3 mm The obtained profile was subject to removal of the background (BG) and separation of the peak using a structure analyzing software (JADE 6, Rigaku Corporation.) supplied with the above apparatus in accordance with the following settings.

[Removal of Kα2 Peak and Removal of Background]
Kα1/Kα2 intensity ratio: 2.0
Deviation (α) of BG curve from BG point: 0.0
[Designation of Peak]
Peak derived from Si (111): 28.4°±0.3°
Peak derived from $SiO_2$: 21°±0.3°
[Separation of Peak]
Profile shape function: Pseudo-Voigt
Fixed Background The half-value width of the peak derived from Si (111) calculated by the structure analyzing software in accordance with the above settings was read, and the size of the silicon crystallite was calculated by the following Scherrer equation.

$$D = K\lambda/B \cos\theta$$

$$B = (B_{obs}^2 - b^2)^{1/2}$$

D: Size (nm) of crystallite
K: Scherrer constant (0.94)
λ: Wavelength of irradiation source (0.15406 nm)
θ: Peak angle of measured half-value width
$B_{obs}$: Half-value width (the measured value obtained using the structure analyzing software)
b: Measured half-value width of standard silicon (Si)

<Measurement of X-Ray Diffraction Peak Intensity Ratio $(P_{Si}/P_{SiO2})$>

The negative electrode active material was analyzed using a powder X-ray diffractometer (MultiFlex (2 kW), Rigaku Corporation) in a similar manner to that described above. A ratio $(P_{Si}/P_{SiO2})$ of an intensity of an X-ray diffraction peak at 2θ of from 27° to 29° derived from Si to an intensity of an X-ray diffraction peak at 2θ of from 20° to 25° derived from $SiO_2$ was calculated with respect to the negative electrode active material.

<Measurement of Mean Aspect Ratio>

A mean aspect ratio of each negative electrode active material was calculated by the method described above using a SEM device (TM-1000, Hitachi High Technologies, Ltd.).

For the negative electrode active material containing the conductive particle described below, only SiO—C particles were selected by EDX-based elemental analysis in advance, and the mean aspect ratio was calculated.

<Measurement of R Value>

An R Value was calculated from a spectrum measured by using a Raman spectrum measurement apparatus (type NSR-1000, JASCO Corporation). The measurement conditions are as follows.

Laser wavelength: 532 nm
Irradiation intensity: 1.5 mW (the value measured with a laser power monitor)
Irradiation time: 60 seconds
Irradiation area: 4 μm$^2$
Measurement range: 830 cm$^{-1}$ to 1940 cm$^{-1}$
Base line: 1050 cm$^{-1}$ to 1750 cm$^{-1}$ A wavenumber of the obtained spectrum was corrected based on a calibration curve determined by a difference between the wavenumber of the respective peaks obtained by measuring a standard substance indene (Wako first grade, Wako Pure Chemical Industries) under the same condition as above and the wavenumber of the theoretical value of the respective peaks of indene.

A peak strength occurred at near 1360 cm$^{-1}$ in the profile obtained after the correction was defined as $I_d$, and a peak strength occurred at near 1580 cm$^{-1}$ in the profile obtained after the correction was defined as $I_g$. A ratio of the both peak intensities $I_d/I_g$ (D/G) was determined as the R value.

<Measurement of $N_2$ Specific Surface Area: Specific Surface Area Calculated from Nitrogen Adsorption>

After vacuum drying a negative electrode active material at 200° C. for 2 hours, nitrogen adsorption at liquid nitrogen temperature (77 K) was measured by the multipoint method using a high-speed specific surface area/pore size analyzer (ASAP2020, Micromeritix Japan Ltd.), and the specific surface area of the negative electrode active material was calculated by a BET method (relative pressure range: from 0.05 to 0.2).

<Measurement of $CO_2$ Specific Surface Area: Specific Surface Area Calculated from Carbon Dioxide Adsorption>

After vacuum drying a negative electrode active material at 200° C. for 2 hours, carbon dioxide adsorption at 273 K was measured by the multipoint method using a fully automated gas adsorption measurement device (AS1-MP, AS-iQ, Quantachrome Corporation), and the specific surface area of the negative electrode active material was calculated by a BET method.

<$CO_2$ Adsorption Amount>

After vacuum drying a negative electrode active material at 200° C. for 2 hours, carbon dioxide adsorption up to a relative pressure of 0.03 at 273 K was measured by a multipoint method using a fully automatic gas absorption measurement device (AS1-MP, AS-iQ, Quantachrome Corporation), and the total adsorption amount was calculated.

<Measurement of $H_2O$ Specific Surface Area: Specific Surface Area Calculated from Moisture Adsorption>

After vacuum drying a negative electrode active material at 100° C. for 2 hours, moisture adsorption at 298 K was measured by the multipoint method using a high precision fully automated gas adsorption measurement device (BEL-SORP18, MicrotracBEL Corp.), and the specific surface area of the negative electrode active material was calculated by a BET method.

<$H_2O$ Adsorption Amount>

After vacuum drying a negative electrode active material at 100° C. for 2 hours, moisture adsorption up to a relative pressure of 0.95 at 298 K was measured by a multipoint method using a high precision fully automated gas adsorption measurement device (BELSORP18, MicrotracBEL Corp.), and the total adsorption amount was calculated.

<Ratio ($S_{H2O}/S_{N2}$) of Specific Surface Area Calculated from Moisture Adsorption to Specific Surface Area Calculated from Nitrogen Adsorption>

By using the $H_2O$ specific surface area and $N_2$ specific surface area calculated by the above manner, a ratio of a specific surface area calculated from moisture adsorption to a specific surface area calculated from nitrogen adsorption was calculated.

(Production of Negative Electrode)

To powder of negative electrode active material (79.0% by mass), powder of Ketjen Black (6.0% by mass) as a conductive aid and an organic binder (15.0% by mass) which has polyacrylonitrile as a main skeleton and acrylic acid and a linear ether group as a binder were added, and then the mixture was kneaded to prepare a composition for a negative electrode. The composition for forming a negative electrode was applied to a glossy surface of an electrolytic copper foil such that the application amount is 2.5 mg/cm$^{-1}$, subjected to a predrying treatment at 90° C. for 2 hours, and then a density of the resultant was adjusted to 1.30 g/cm$^3$ by roll pressing. Subsequently, the resultant was dried at 120° C. for 4 hours in a vacuum atmosphere, thereby obtaining a negative electrode.

Production of Lithium Ion Secondary Battery

A 2016-type coin cell was produced using the above-obtained negative electrode, a metal lithium as a counter electrode, a mixed liquid of 1M $LiPF_6$ containing ethyl carbonate (EC), diethyl carbonate (DEC) and ethyl methyl carbonate (EMC) (volume ratio=1:1:1) and vinylene carbonate (VC) (1.0% by mass) as an electrolytic solution, a polyethylene microporous film having a thickness of 25 μm as a separator, and a copper plate having a thickness of 250 μm as a spacer.

<Cell Performance (Initial Discharge Capacity, Initial Charge and Discharge Efficiency)>

The above-obtained cell was placed in a thermostat kept at 25° C., and an initial charge capacity was measured by carrying out charging at a constant current of 0.45 mA/cm$^2$ up to 0 V and then further charging at a constant voltage of 0 V until the current reached a value corresponding to 0.02 mA/cm$^2$. After the charging, 30-minute pause was taken and then discharging was carried out. The discharging was carried out at a current of 0.45 mA/cm$^2$ until the voltage value reached 1.5 V, and then an initial discharge capacity was measured. Here, the capacity was converted to a value per the mass of the negative electrode active material used. Calculation was performed by dividing the initial discharge capacity by the initial charge capacity to obtain a value and then multiplying the obtained value by 100, to obtain another value, which is defined as an initial charge and discharge efficiency (%). The result is shown in Table 1.

<Cycle Characteristics>

The above-obtained cell was placed in a thermostat kept at 25° C., charged at a constant current of 0.45 mA/cm$^2$ up to 0 V and then further charged at a constant voltage of 0 V until the current reached a value corresponding to 0.02 mA/cm². After the charging, 30-minute pause was taken and then discharging was carried out. The discharging was carried out at a current of 0.45 mA/cm² until the voltage value reached 1.5 V. The charge and discharge was defined as one cycle. A cycle test which includes performing the one cycle 10 times was conducted, and a cycle characteristic calculated by the following equation was evaluated. The result is shown in Table 1.

Cycle characteristics (10-cycle capacity retention rate)=[discharge capacity at 10th cycle/discharge capacity at 1st cycle]×100(%)   Equation:

<Storage characteristics at High Temperature (Retention Rate and Recovery Rate)>

The above-obtained cell was placed in a thermostat kept at 25° C., charged at a constant current of 0.45 mA/cm² up to 0 V and then further charged at a constant voltage of 0 V until the current reached a value corresponding to 0.02 mA/cm². After the charging, 30-minute pause was taken and then discharging was carried out. The discharging was carried out at a current of 0.45 mA/cm² until the voltage value reached 1.5 V.

After the charging of second cycle was performed under the same conditions as described above, the cell was placed in a thermostat kept at 70° C. in a charged state and stored for 72 hours. Thereafter, the cell was again placed in a thermostat kept at 25° C., and discharging was carried out at a current of 0.45 mA/cm⁻¹ until the voltage value reached 1.5V. A ratio of a discharge capacity immediately after storage at 70° C. to an initial discharge capacity was defined as a retention rate of a storage characteristics. The result is shown in Table 1.

Then, using a thermostat kept at 25° C., the charge/discharge test was performed in third cycle under the same conditions as described above. A ratio of a discharge capacity in the third cycle to the initial discharge capacity was defined as a recovery rate of the storage characteristics. The results are given in Table 1.

<Expansion Rate>

The above-obtained cell was placed in a thermostat kept at 25° C., charged at a constant current of 0.45 mA/cm² up to 0 V and then further charged at a constant voltage of 0 V until the current reached a value corresponding to 0.02 mA/cm². After the charging, 30-minute pause was taken and then discharging was carried out. The discharging was carried out at a current of 0.45 mA/cm² until the voltage value reached 1.5 V.

After the charging of second cycle was performed under the same conditions as described above, the charging was stopped at the state in charge, and the coin cell was dismantled so that a thickness of the electrode was measured. Calculation was performed by dividing the above thickness by a thickness before charge and discharge test to obtain a value and then multiplying the obtained value by 100, to obtain another value, which is defined as an expansion rate.

Examples 2 to 4

Negative electrode active materials were produced and evaluated in the same manner as in Example 1, except that the temperature of heat treatment at which the carbonization of the carbon source and the disproportionation reaction of the silicon oxide were made to occur was changed to 1000° C. (Example 2), 1050° C. (Example 3) and 1100° C. (Example 4), respectively. The results are shown in Table 1.

Comparative Examples 1 and 2

Negative electrode active materials were produced and evaluated in the same manner as in Example 1, except that the temperature of heat treatment at which the carbonization of the carbon source and the disproportionation reaction of the silicon oxide were made to occur was changed to 900° C. (Comparative example 1) and 1200° C. (Comparative example 2), respectively. The results are shown in Table 2.

Example 5

A negative electrode active material was produced and evaluated in the same manner as in Example 2, except that the silicon oxide particles having a volume mean particle diameter (D50%) of 5 μm obtained after the process of pulverizing the silicon oxide particle were further subject to an additional treatment of surface modification by NOBILTA (NOB-VC, Hosokawa Micron Co., Ltd.). The results are shown in Table 1.

Example 6

A negative electrode active material was produced and evaluated in the same manner as in Example 2, except that the silicon oxide particles having a volume mean particle diameter (D50%) of 5 μm obtained after the process of pulverizing the silicon oxide particles were further subject to an additional treatment of surface modification by MECHANOFUSION system (Lab, Hosokawa Micron Co., Ltd.). The results are shown in Table 1.

Example 7

A negative electrode active material was produced and evaluated in the same manner as in Example 2, except that a fine impact mill: pin mill type (UP, Hosokawa Micron Co., Ltd.) was used as a pulverizing apparatus in the process of pulverizing the silicon oxide particles, and the silicon oxide particles were pulverized so that a volume mean particle diameter (D50%) became 5 μm. The results are shown in Table 1.

Example 8

A negative electrode active material was produced and evaluated in the same manner as in Example 2, except that a fine mill (SF type, Nippon Coke & Engineering Co., Ltd.) was used as a pulverizing apparatus in the process of pulverizing the silicon oxide particles, and the silicon oxide particles were pulverized so that a volume mean particle diameter (D50%) became 5 μm. The results are shown in Table 1.

Example 9

A negative electrode active material was produced and evaluated in the same manner as in Example 2, except that the partial pressure of acetylene gas was changed to 20%, and the duration of treatment thereof was changed to 4 hours. The results are shown in Table 1.

Example 10

A negative electrode active material was produced and evaluated in the same manner as in Example 2, except that a compressed natural gas was used as a carbon source. The results are shown in Table 2.

Example 11

A negative electrode active material was produced and evaluated in the same manner as in Example 10, except that the partial pressure of the compressed natural gas was changed to 20%. The results are shown in Table 2.

Example 12

A negative electrode active material was produced and evaluated in the same manner as in Example 2, except that a methane gas was used as a carbon source. The results are shown in Table 2.

Example 13

A negative electrode active material was produced and evaluated in the same manner as in Example 12, except that the partial pressure of the methane gas was changed to 20%. The results are shown in Table 2.

Example 14

1000 g of silicon oxide particles with a volume mean particle diameter (D50%) of 5 μm obtained after the process of pulverizing silicon oxide in Example 1 and 34 g of petroleum-based pitch (75% by mass of fixed carbon) as a carbon source of carbon were fed into a mixing device (Rocking Mixer RM-10G, AICHI ELECTRIC Co., Ltd.) and mixed for 5 minutes, and then filled into an alumina heat treatment vessel. After filling the heat treatment vessel, a heat treatment was carried out in an atmospheric sintering furnace under a nitrogen atmosphere at 1000° C. for 5 hours to carbonize the carbon source to obtain a heat treated product. The obtained heat treated product was disintegrated by a mortar and sieved by a 300 M (300 mesh) test sieve to prepare a negative electrode active material. Subsequently, the same evaluation was performed as in Example 1. The results are shown in Table 2.

Example 15

A negative electrode active material was produced and evaluated in the same manner as in Example 12, except that the amount of petroleum-based pitch was changed to 67 g. The results are shown in Table 2.

Comparative Example 3

A negative electrode active material was produced and evaluated in the same manner as in Example 9, except that the partial pressure of acetylene gas was changed to 30%. The results are shown in Table 2.

TABLE 1

| Item | Example 1 | Example 2 | Example 3 | Example 4 | Example 5 | Example 6 | Example 7 | Example 8 | Example 9 |
|---|---|---|---|---|---|---|---|---|---|
| Heat Treatment Temperature [° C.] | 950 | 1000 | 1050 | 1100 | 1000 | 1000 | 1000 | 1000 | 1000 |
| XRD Intensity Ratio ($P_{Si}/P_{SiO2}$) [—] | 1.3 | 1.6 | 1.9 | 2.5 | 1.7 | 1.6 | 1.7 | 1.6 | 1.6 |
| Carbon Content [% by mass] | 2.3 | 2.5 | 2.5 | 2.6 | 2.4 | 2.5 | 2.4 | 2.5 | 9.7 |
| Size of Silicon Crystallite [nm] | 2.9 | 4.0 | 5.7 | 7.9 | 4.1 | 4.0 | 3.9 | 4.0 | 4.1 |
| R value (D/G) | 0.9 | 1.0 | 0.9 | 0.9 | 0.9 | 1.0 | 1.0 | 0.9 | 0.9 |
| Specific Surface Area [m²/g] $N_2$ | 3.7 | 2.6 | 2.4 | 2.3 | 2.4 | 2.2 | 2.8 | 3.1 | 4.2 |
| Specific Surface Area [m²/g] $H_2O$ | 1.4 | 1.1 | 0.78 | 0.66 | 0.97 | 0.73 | 1.5 | 1.8 | 2.5 |
| Specific Surface Area [m²/g] $CO_2$ | 4.7 | 1.0 | 0.5 | 0.3 | 0.6 | 0.4 | 1.4 | 1.6 | 3.8 |
| Ratio ($S_{H2O}/S_{N2}$) [—] | 0.378 | 0.423 | 0.325 | 0.287 | 0.404 | 0.332 | 0.536 | 0.581 | 0.595 |
| $CO_2$ Adsorption Amount [cm³/g] | 0.44 | 0.13 | 0.11 | 0.10 | 0.11 | 0.06 | 0.17 | 0.21 | 0.64 |
| $H_2O$ Adsorption Amount [cm³/g] | 3.2 | 2.2 | 2.5 | 1.4 | 2.1 | 2.2 | 2.9 | 3.5 | 6.6 |
| Volume Mean Particle Diameter [μm] | 5.8 | 5.7 | 5.6 | 5.6 | 5.5 | 5.6 | 5.6 | 5.7 | 6.7 |
| D10% Particle Diameter [μm] | 3.71 | 3.79 | 3.78 | 3.76 | 3.97 | 4.03 | 1.48 | 1.32 | 3.80 |
| D90% Particle Diameter [μm] | 8.28 | 8.52 | 8.40 | 8.43 | 7.78 | 7.42 | 11.65 | 11.48 | 8.44 |
| D10%/D90% [μm] | 0.448 | 0.445 | 0.450 | 0.446 | 0.510 | 0.543 | 0.127 | 0.115 | 0.450 |
| Mean aspect ratio [—] | 0.70 | 0.74 | 0.75 | 0.72 | 0.84 | 0.90 | 0.69 | 0.57 | 0.73 |
| Initial Discharge Capacity [mAh/g] | 1349 | 1399 | 1418 | 1442 | 1443 | 1466 | 1355 | 1332 | 1377 |
| Initial Charge and Discharge Efficiency [%] | 68.1 | 71.5 | 72.1 | 73.2 | 72.8 | 74.0 | 70.7 | 70.0 | 70.5 |
| Storage Characteristics at High Temperature/Retention Rate [%] | 91.1 | 91.9 | 92.2 | 91.3 | 92.6 | 95.8 | 91.4 | 90.6 | 91.3 |
| Storage Characteristics at High Temperature/Recovery Rate [%] | 88.7 | 89.1 | 90.1 | 89.0 | 91.5 | 95.7 | 88.9 | 88.0 | 88.8 |
| 10-Cycle Capacity Retention Rate [%] | 82.8 | 84.6 | 85.9 | 84.3 | 87.9 | 91.8 | 82.9 | 82.2 | 85.7 |
| Expansion Rate | 299 | 291 | 293 | 298 | 286 | 279 | 296 | 307 | 322 |

TABLE 2

| Item | Example 10 | Example 11 | Example 12 | Example 13 | Example 14 | Example 15 | Comparative Example 1 | Comparative Example 2 | Comparative Example 3 |
|---|---|---|---|---|---|---|---|---|---|
| Heat Treatment Temperature [° C.] | 1000 | 1000 | 1000 | 1000 | 1000 | 1000 | 900 | 1200 | 1000 |
| XRD Intensity Ratio ($P_{Si}/P_{SiO2}$) [—] | 1.6 | 1.7 | 1.6 | 1.7 | 1.6 | 1.7 | 0.9 | 2.9 | 1.6 |

TABLE 2-continued

| Item | | Example 10 | Example 11 | Example 12 | Example 13 | Example 14 | Example 15 | Comparative Example 1 | Comparative Example 2 | Comparative Example 3 |
|---|---|---|---|---|---|---|---|---|---|---|
| Carbon Content [% by mass] | | 2.3 | 5.9 | 2.0 | 4.8 | 2.5 | 4.9 | 2.4 | 2.5 | 15.3 |
| Size of Silicon Crystallite [nm] | | 5.1 | 4.9 | 5.0 | 5.3 | 4.1 | 4.0 | 1.7 | 16.9 | 4.2 |
| R value (D/G) | | 0.8 | 0.9 | 1.0 | 0.9 | 0.9 | 0.9 | 1.0 | 1.0 | 1.0 |
| Specific | $N_2$ | 2.1 | 2.0 | 2.2 | 2.0 | 2.7 | 3.0 | 4.5 | 2.0 | 10.8 |
| Surface | $H_2O$ | 0.55 | 0.51 | 0.19 | 0.15 | 1.0 | 1.2 | 2.1 | 0.52 | 6.7 |
| Area [m$^2$/g] | $CO_2$ | 0.4 | 0.2 | 0.5 | 0.2 | 0.9 | 1.0 | 5.7 | 0.2 | 8.8 |
| Ratio ($S_{H2O}/S_{N2}$) [—] | | 0.262 | 0.255 | 0.086 | 0.075 | 0.370 | 0.400 | 0.467 | 0.260 | 0.620 |
| $CO_2$ Adsorption Amount [cm$^3$/g] | | 0.03 | 0.04 | 0.05 | 0.03 | 0.15 | 0.17 | 0.62 | 0.05 | 2.33 |
| $H_2O$ Adsorption Amount [cm$^3$/g] | | 1.8 | 1.6 | 1.9 | 1.5 | 2.3 | 2.9 | 4.6 | 1.1 | 8.6 |
| Volume Mean Particle Diameter [μm]*D50% | | 5.7 | 5.8 | 5.4 | 5.5 | 5.5 | 5.6 | 5.5 | 5.6 | 7.4 |
| D10% Particle Diameter [μm] | | 4.31 | 4.53 | 3.21 | 3.18 | 3.80 | 3.79 | 3.79 | 3.80 | 3.61 |
| D90% Particle Diameter [μm] | | 9.82 | 9.98 | 8.14 | 8.15 | 8.48 | 8.52 | 8.48 | 8.52 | 8.78 |
| D10%/D90% [μm] | | 0.439 | 0.454 | 0.394 | 0.390 | 0.448 | 0.445 | 0.447 | 0.446 | 0.411 |
| Mean aspect ratio [—] | | 0.74 | 0.74 | 0.72 | 0.73 | 0.73 | 0.74 | 0.73 | 0.75 | 0.78 |
| Initial Discharge Capacity [mAh/g] | | 1454 | 1461 | 1448 | 1420 | 1386 | 1389 | 1330 | 902 | 1191 |
| Initial Charge and Discharge Efficiency [%] | | 74.0 | 73.9 | 73.5 | 73.9 | 70.1 | 70.5 | 66.8 | 73.5 | 67.9 |
| Storage Characteristics at High Temperature/Retention Rate [%] | | 95.1 | 95.6 | 95.6 | 95.5 | 91.2 | 92.0 | 87.2 | 90.1 | 88.2 |
| Storage Characteristics at High Temperature/Recovery Rate [%] | | 95.6 | 95.2 | 96.6 | 97.6 | 88.9 | 89.5 | 83.5 | 87.1 | 86.3 |
| 10-Cycle Capacity Retention Rate [%] | | 92.2 | 92.8 | 93.5 | 94.1 | 84.0 | 85.1 | 78.3 | 81.9 | 81.6 |
| Expansion Rate | | 278 | 273 | 264 | 260 | 289 | 283 | 334 | 310 | 355 |

As shown in Tables 1 and 2, the lithium-ion secondary batteries of Examples 1 to 15, each of which using the negative electrode active material having the X-ray diffractive peak intensity ratio ($P_{Si}/P_{SiO2}$) and the ratio ($S_{H2O}/S_{N2}$) satisfying the specified conditions, exhibited high initial discharge capacities, restriction of expansion of the electrode and excellent storage characteristics at high temperature.

The negative electrode active materials of Comparative examples 1 and 2, each of which failed to satisfy the specified condition of the X-ray diffractive peak intensity ratio ($P_{Si}/P_{SiO2}$), were inferior to Examples in terms of the initial discharge capacity.

The negative electrode active materials of Comparative example 3, of which failed to satisfy the ratio ($S_{H2O}/S_{N2}$), were inferior to Examples in terms of the initial discharge capacity, the initial charge and discharge efficiency, the expansion rate, the cycle characteristics and the storage characteristics at high temperature.

All publications, patent applications, and technical standards mentioned in this specification are herein incorporated by reference to the same extent as if each individual publication, patent application, or technical standard was specifically and individually indicated to be incorporated by reference.

EXPLANATION OF REFERENCE NUMERALS

10: Carbon
12: Carbon granule
20: Silicon oxide particle

The invention claimed is:

1. A negative electrode active material for a lithium ion secondary battery, the negative electrode active material comprising silicon oxide particles, each of which has carbon on at least a portion of its surface, wherein:
   a ratio ($P_{Si}/P_{SiO2}$) of an intensity of an X-ray diffraction peak at 2θ of from 27° to 29°, which is derived from Si, to an intensity of an X-ray diffraction peak at 2θ of from 20° to 25°, which is derived from $SiO_2$, is within a range of from 1.0 to 2.6, when CuKα radiation having a wavelength of 0.15406 nm is used as a radiation source; and
   a ratio ($S_{H2O}/S_{N2}$) of a specific surface area calculated from moisture adsorption at 298 K to a specific surface area calculated from nitrogen adsorption at 77 K is 0.60 or less,
   wherein the negative electrode active material has a ratio (D10%/D90%) of 0.1 or greater, in which D90% is a particle diameter corresponding to 90% cumulative from a smaller particle diameter side in a cumulative volume distribution curve obtained by a laser diffraction/scattering method, and D10% is a particle diameter corresponding to 10% cumulative from the smaller particle diameter side in the cumulative volume distribution curve.

2. The negative electrode active material for a lithium ion secondary battery according to claim 1, wherein an mean aspect ratio represented by a ratio (S/L) of a minor axis S to a major axis L is within a range of 0.45≤S/L≤1.

3. The negative electrode active material for a lithium ion secondary battery according to claim 1, wherein a content of the carbon is within a range from 0.1% by mass to 10.0% by mass of a total of the silicon oxide particles and the carbon.

4. The negative electrode active material for a lithium ion secondary battery according to claim 1, the negative electrode active material having a diffraction peak that is attributed to Si (111) in X-ray diffraction spectra, wherein a size of silicon crystallites calculated from the diffraction peak is from 1.0 nm to 15.0 nm.

5. The negative electrode active material for a lithium ion secondary battery according to claim 1, wherein a volume mean particle diameter is from 0.1 μm to 20 μm.

6. The negative electrode active material for a lithium ion secondary battery according to claim 1, wherein a specific surface area calculated from nitrogen adsorption at 77 K is from 0.1 m$^2$/g to 10 m$^2$/g.

7. The negative electrode active material for a lithium ion secondary battery according to claim 1, further comprising a carbon-based negative electrode active material.

8. A negative electrode for a lithium ion secondary battery, the negative electrode comprising:
- a current collector; and
- a negative electrode material layer that is provided on or above the current collector and that comprises the negative electrode active material for a lithium ion secondary battery according to claim 1.

9. A lithium ion secondary battery, comprising:
- a positive electrode;
- the negative electrode for a lithium ion secondary battery according to claim 8; and
- an electrolyte.

10. The negative electrode active material for a lithium ion secondary battery according to claim 1, wherein the negative electrode active material has a ratio (D10%/D90%) of 1.0 or less.

11. The negative electrode active material for a lithium ion secondary battery according to claim 1, wherein the negative electrode active material has a ratio (D10%/D90%) of 0.8 or less.

12. The negative electrode active material for a lithium ion secondary battery according to claim 1, wherein the negative electrode active material has a ratio (D10%/D90%) of 0.6 or less.

* * * * *